US009171404B1

(12) United States Patent
Johnson

(10) Patent No.: US 9,171,404 B1
(45) Date of Patent: Oct. 27, 2015

(54) AUGMENTED REALITY GREETING CARDS

(71) Applicant: Kurt D. Johnson, St. Paul, MN (US)

(72) Inventor: Kurt D. Johnson, St. Paul, MN (US)

(73) Assignee: POPCARDS, LLC, Minneapolis, MN (US)

( * ) Notice: Subject to any disclaimer, the term of this patent is extended or adjusted under 35 U.S.C. 154(b) by 0 days.

(21) Appl. No.: 14/691,069

(22) Filed: Apr. 20, 2015

(51) Int. Cl.
*H04N 5/262* (2006.01)
*G06T 19/00* (2011.01)
*H04N 5/232* (2006.01)
*H04N 1/00* (2006.01)
*H04N 9/083* (2006.01)
*H04N 5/225* (2006.01)
*H04N 9/04* (2006.01)
*A61B 19/00* (2006.01)

(52) U.S. Cl.
CPC .......... *G06T 19/006* (2013.01); *H04N 1/00209* (2013.01); *H04N 5/2254* (2013.01); *H04N 5/23229* (2013.01); *H04N 5/23293* (2013.01); *H04N 9/045* (2013.01); *H04N 9/083* (2013.01); *A61B 2019/5291* (2013.01); *G05B 2219/39451* (2013.01); *H04N 2201/3245* (2013.01)

(58) Field of Classification Search
CPC ..... H04N 9/083; H04N 5/2254; H04N 9/045; H04N 2201/3245; A61B 2019/5291; G05B 2219/32014; G05B 2219/39451; G05B 2219/39949; G06K 9/00671; H04M 2203/359
USPC ................. 348/239, 333.01, 333.05
See application file for complete search history.

(56) References Cited

U.S. PATENT DOCUMENTS

| 5,062,229 | A | 11/1991 | Werjefelt |
| 7,480,422 | B2 * | 1/2009 | Ackley et al. ................. 382/309 |
| 8,042,040 | B2 | 10/2011 | Lynton |
| 8,433,336 | B2 | 4/2013 | Lee et al. |
| 8,547,401 | B2 | 10/2013 | Mallinson et al. |
| 8,589,314 | B2 | 11/2013 | Friedman |
| 8,726,548 | B2 | 5/2014 | Larson et al. |
| 8,736,429 | B2 | 5/2014 | Lien et al. |
| 8,751,474 | B2 | 6/2014 | Ogilvie et al. |
| 2001/0039206 | A1 | 11/2001 | Peppel |
| 2005/0152002 | A1 * | 7/2005 | Shirakawa et al. .......... 358/1.18 |
| 2009/0070213 | A1 | 3/2009 | Miller et al. |

(Continued)

OTHER PUBLICATIONS

Dropbox—How do I use Camera Upload?, Mar. 8, 2013, available Online at http://www.dropbox.com/help/289, retrieved Apr. 19, 2015, 2 pages.

(Continued)

*Primary Examiner* — Yogesh Aggarwal
(74) *Attorney, Agent, or Firm* — Krenz Patent Law, LLC

(57) ABSTRACT

A computer-implemented method of acquiring electronic content for an augmented reality greeting card includes presenting, on a display screen of a mobile computing device that includes a camera, a camera viewer with an aspect ratio that matches an aspect ratio of a placeholder of a predefined greeting card template. A photograph with an aspect ratio that matches the aspect ratio of the placeholder is captured at a first resolution via the camera. A video is recorded via the camera at a second, lower resolution, where an aspect ratio of the recorded video matches the aspect ratio of the placeholder. The recorded video is uniquely associated with the captured photograph, and the captured photograph, the recorded video, and an indication of the unique association between the captured photograph and the recorded video are transmitted for receipt by a remote computer system via a transmitter of the mobile computing device.

20 Claims, 14 Drawing Sheets

(56) References Cited

U.S. PATENT DOCUMENTS

| | | |
|---|---|---|
| 2009/0202114 A1 | 8/2009 | Morin et al. |
| 2010/0138506 A1 | 6/2010 | Van |
| 2011/0201362 A1 | 8/2011 | Bregman-Amitai et al. |
| 2011/0209365 A1 | 9/2011 | Marsh et al. |
| 2011/0247247 A1 | 10/2011 | Mayer et al. |
| 2012/0022924 A1 | 1/2012 | Runnels et al. |
| 2012/0077470 A1 | 3/2012 | Kim et al. |
| 2012/0102398 A1* | 4/2012 | Cok .............................. 715/274 |
| 2012/0232968 A1 | 9/2012 | Calman et al. |
| 2012/0271732 A1 | 10/2012 | Glass et al. |
| 2012/0282905 A1 | 11/2012 | Owen |
| 2013/0042508 A1 | 2/2013 | Mayes |
| 2013/0147838 A1 | 6/2013 | Small et al. |
| 2013/0211970 A1 | 8/2013 | Glass et al. |
| 2013/0212453 A1 | 8/2013 | Gudai et al. |
| 2013/0222426 A1 | 8/2013 | Hymel |
| 2013/0332308 A1 | 12/2013 | Linden et al. |
| 2014/0076965 A1 | 3/2014 | Becorest et al. |
| 2014/0108136 A1 | 4/2014 | Zhao et al. |
| 2014/0125699 A1 | 5/2014 | Lotto et al. |
| 2014/0160157 A1 | 6/2014 | Poulos et al. |
| 2014/0187201 A1 | 7/2014 | Saatchi et al. |

OTHER PUBLICATIONS

Dvdvideosoft.com, "Free Video Software: Download free Video to JPG Converter—make snapshots . . . ," Mar. 23, 2013, available Online at: http://www.dvdvideosoft.com/products/dvd/Free-Video-to-JPG-Converter.htm#. VTQaszqmeOJ, retrieved Apr. 19, 2015, 4 pages.

Hallmark, "Augmented Reality | Hallmark Cards," Aug. 4, 2014, available Online at: http://www.hallmark.com/online/webcam-greetings.aspx, retrieved Apr. 19, 2015, 1 page.

Jackson, C., Augmented Reality Trends, DIY Augmented Reality Cards, Jan. 31, 2014, available at http://www.augmentedrealitytrends.com/augmented-reality/augmented-reality-cards.html, retrieved Apr. 20, 2015, 4 pages.

Jackson, C., Augmented Reality Trends, "Smilez AR App Lets You Send Video-Message on a Post Card," Aug. 5, 2014, available Online at http://www.augmentedrealitytrends.com/ar-app/smilez-ar-app.html, retrieved Apr. 20, 2015, 4 pages.

Littleboy, J., Kickstarter, GISMO: Augmented Reality Greeting Cards, Dec. 9, 2013, available Online at https://www.kickstarter.com/projects/artiphany/gizmo-augmented-reality-greeting-cards, retrieved Apr. 20, 2015, 10 pages.

Reactive Paper—Augmented Reality Stationery on Vimeo, believed to be available Apr. 20, 2013, available Online at https://vimeo.com/56928226, retrieved Apr. 20, 2015, 2 pages.

TechCrunch, "Dekko Debuts an augmented Racing Game Playable From the iPad," Apr. 4, 2015, available Online at http://techcrunch.com/2013/06/09/dekko-2/, retrieved Apr. 20, 2015, 5 pages.

Williams, M., "Quickly extract frames from any video with Free Video to JPEG Converter," Aug. 27, 2013, available Online at http://betanews.com/2013/07/18/quickly-extract-frames-from-any-video-with-free-video-to-jpeg-converter/, retrieved Apr. 19, 2015, 2 pages.

* cited by examiner

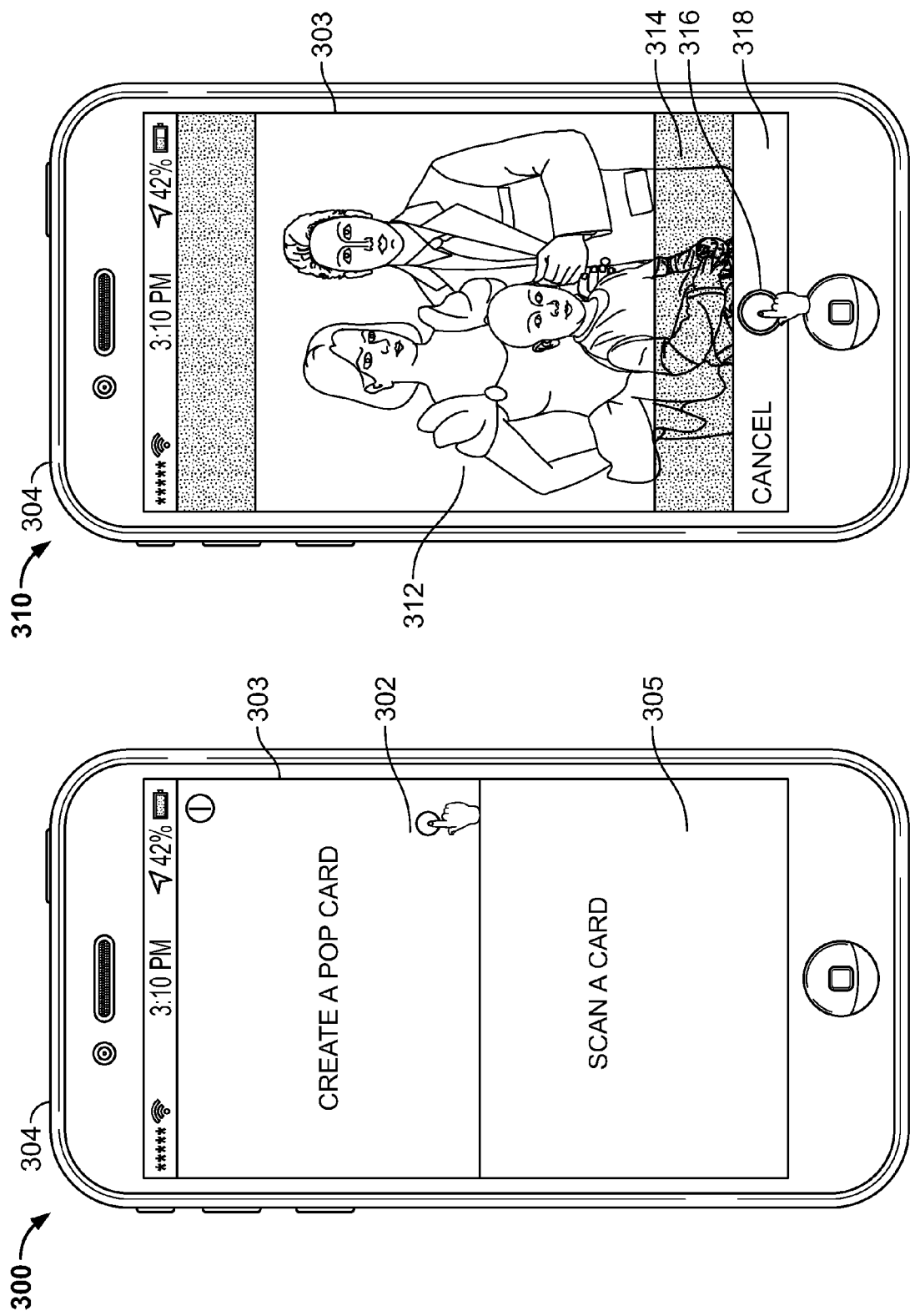

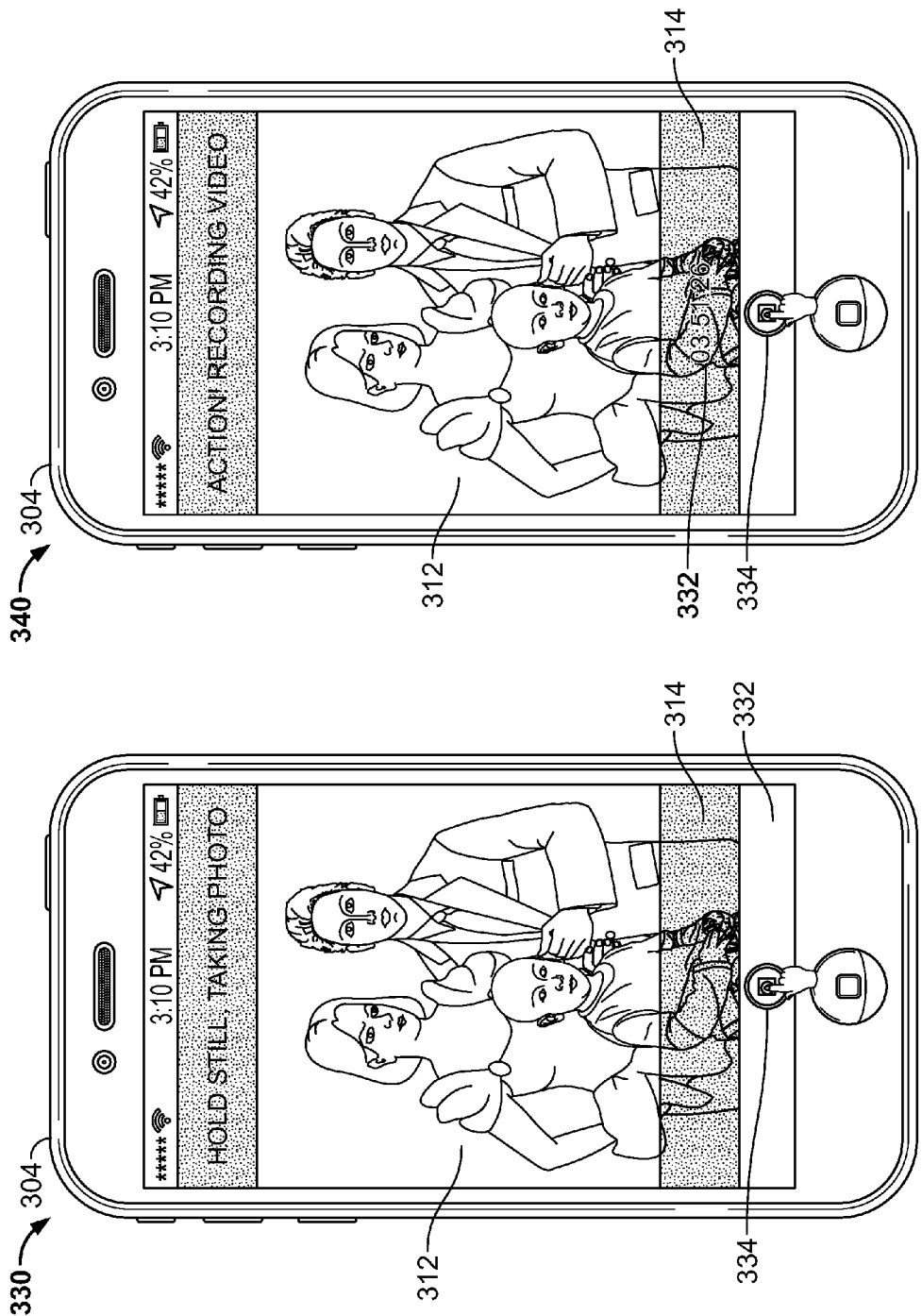

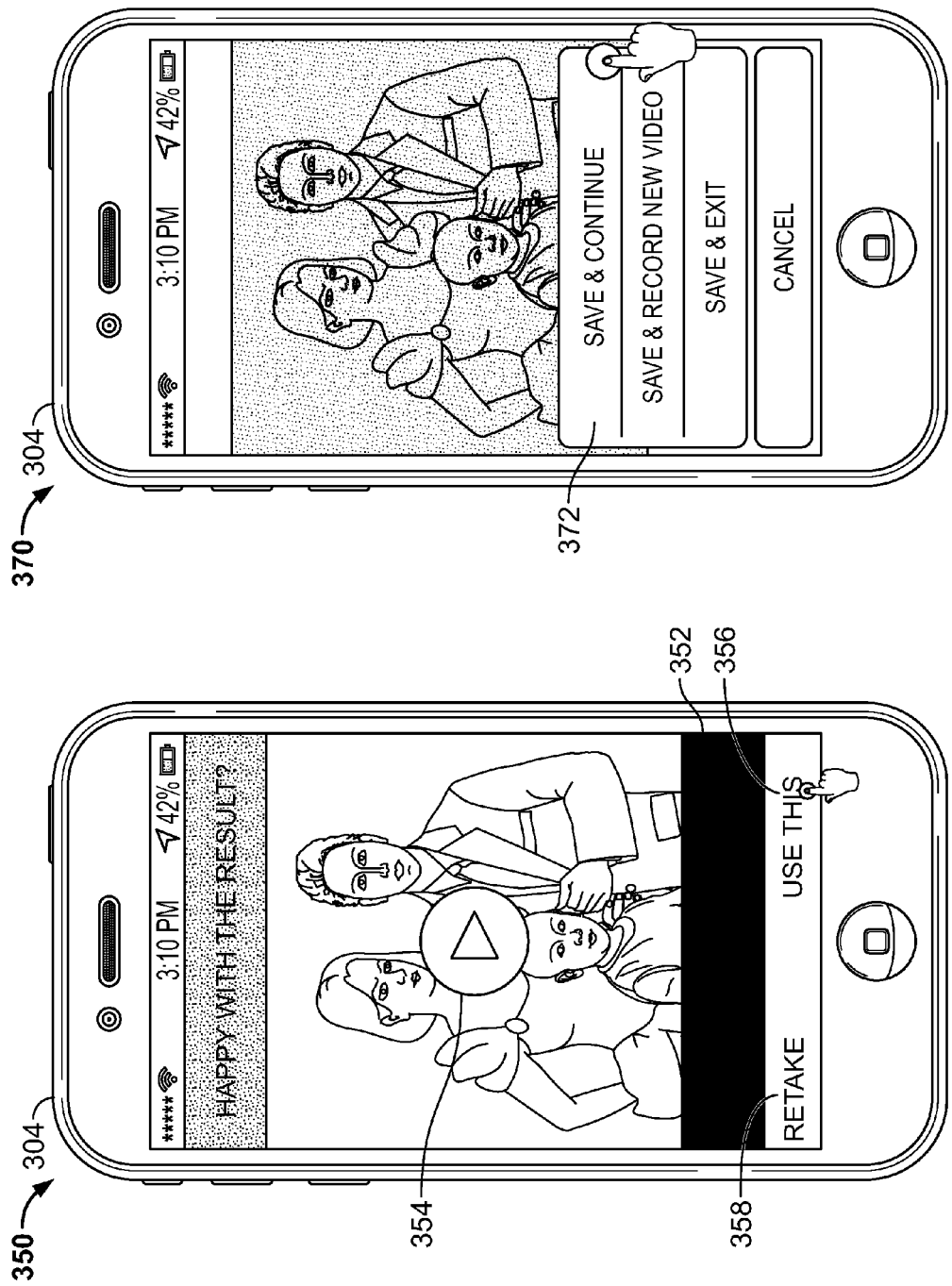

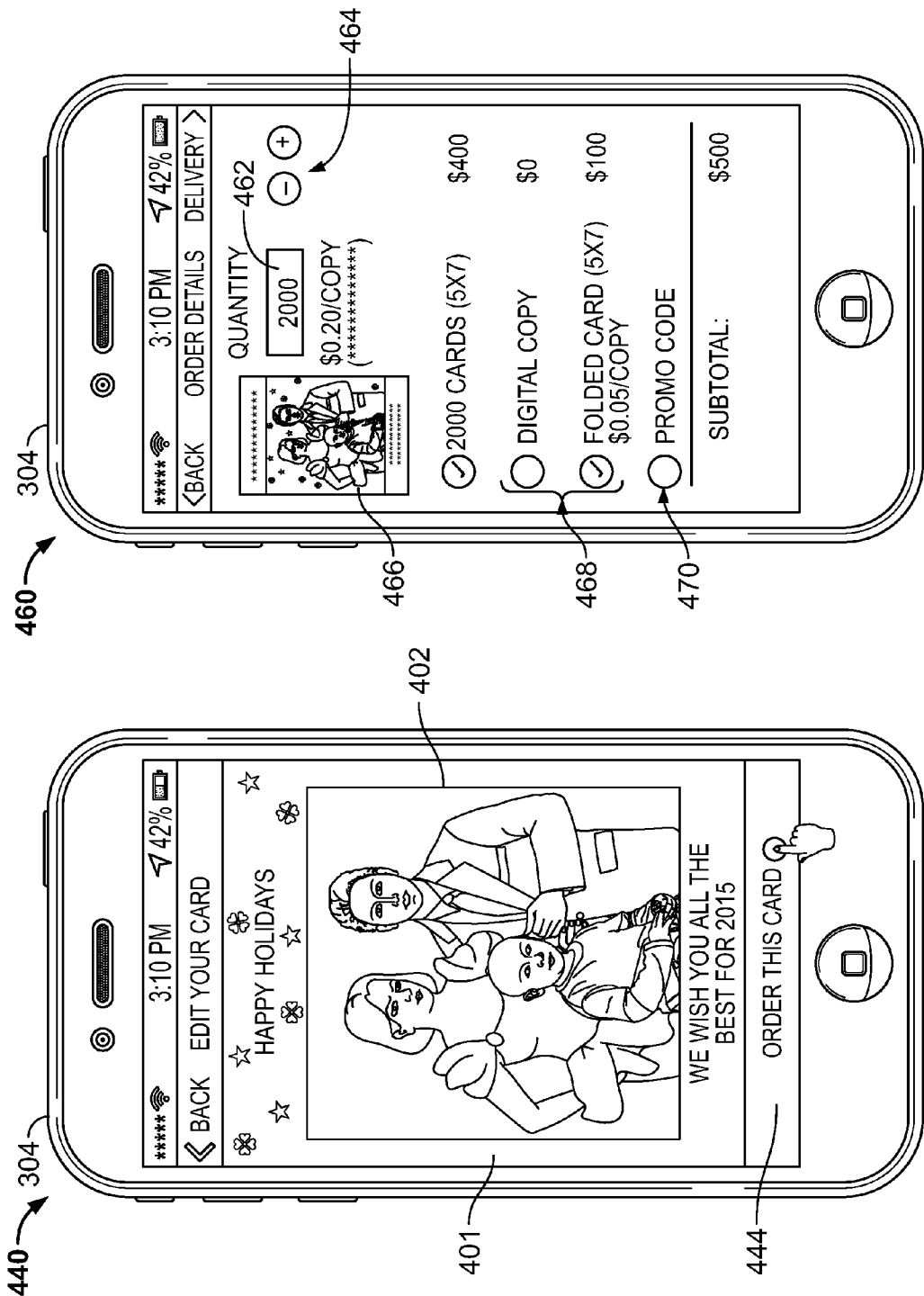

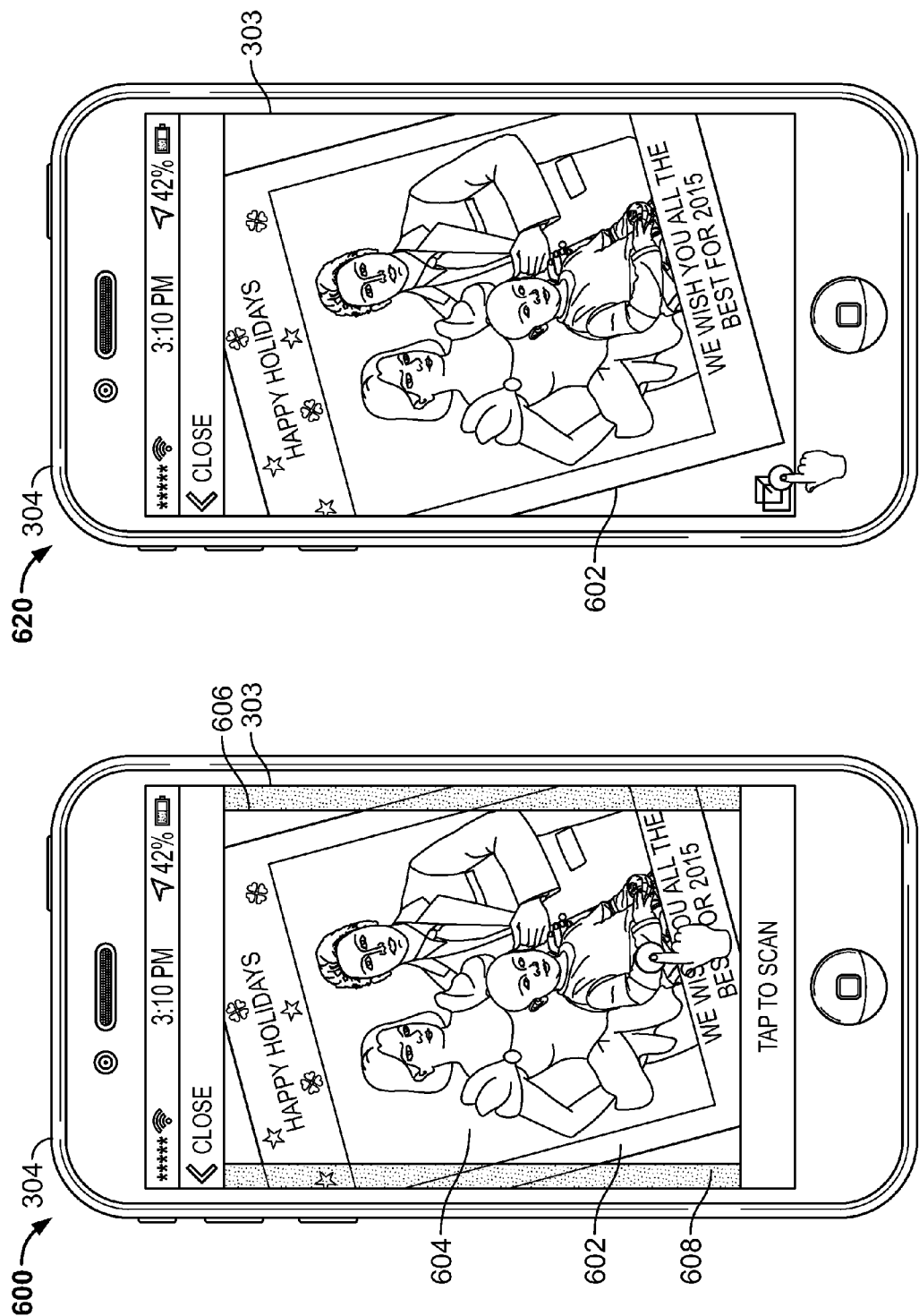

AUGMENTED REALITY GREETING CARDS

TECHNICAL FIELD

This document generally describes computer-based technology for creating an augmented reality greeting card, and for presenting the augmented reality greeting card.

BACKGROUND

Traditional greeting cards have long been used to convey information from a sending party to a receiving party. The information conveyed by the greeting card can be for any number of purposes, such as to offer thanks, to offer sympathy, to congratulate, to inform of an upcoming event, to provide an update, or to recognize a holiday or special occasion. Greeting cards have historically been printed on cardstock, and either hand-delivered or delivered by a postal service or other delivery service. More recently, electronic delivery (e.g., via email) of electronic greeting cards has also been used. Greeting cards can be generic without specific reference to the sending party or receiving party, or can be personalized to include one or more photographs selected by the sending party, and in some cases the sending party can provide a photograph to be included on the greeting card.

Mobile computing devices, such as smartphones and tablet computing devices, have been used to capture photographs or videos using a camera included with the mobile computing device. For example, a user may take a photograph or record a video using the camera of their smartphone. Upon selection of the camera, for example, the smartphone displays on a display screen of the device one or more camera control features and a camera viewer that provides a view of a subject to be photographed or recorded. The camera viewer and camera control features together typically occupy all or substantially all of the display screen, which typically has an aspect ratio of approximately 16:9 for modern smartphones.

SUMMARY

In a first general aspect, a computer-implemented method of acquiring electronic content for an augmented reality greeting card includes presenting, on a display screen of a mobile computing device that includes a camera, a camera viewer, where an aspect ratio of the camera viewer matches an aspect ratio of a placeholder of a predefined greeting card template. The method also includes capturing, via the camera of the mobile computing device, a photograph at a first resolution, where an aspect ratio of the captured photograph matches the aspect ratio of the placeholder of the greeting card template. The method further includes recording, via the camera of the mobile computing device, a video at a second resolution that is lower than the first resolution, where an aspect ratio of the recorded video matches the aspect ratio of the placeholder of the greeting card template. The method further includes uniquely associating the recorded video with the captured photograph, and transmitting, for receipt by a remote computer system, the captured photograph at the first resolution, the recorded video at the second resolution, and an indication of the unique association between the recorded video and the captured photograph, via a transmitter of the mobile computing device.

Implementations can include one or more of the following. The method can further include presenting a preview of the captured photograph on the display screen of the mobile computing device. The method can further include presenting a preview of a greeting card on the display screen of the mobile computing device, where the greeting card is based on the greeting card template and the preview of the greeting card includes the captured photograph. The video can include a plurality of individual frames of the video, and the captured photograph can be different from each frame of the plurality of individual frames of the video. The photograph can be captured before the video is recorded. The recorded video can be uniquely associated with the captured photograph based on a naming convention. The aspect ratio of the camera viewer can be in a range of about 1:1 to about 1.3:1. The method can further include presenting, on the display screen of the mobile computing device, a shaded view at a display intensity that is less than a display intensity of the camera viewer. The camera viewer can occupy an area of the display screen that is less than an entire area of the display screen. The display screen can have an aspect ratio of about 16:9 and the camera viewer can have an aspect ratio in a range of about 1:1 to about 1.3:1. The method can further include presenting, on the display screen of the mobile computing device, (i) a view of a greeting card that includes the captured photograph, and (ii) the recorded video.

In a second general aspect, a computer-implemented method of acquiring electronic content for an augmented reality greeting card includes presenting, on a display screen of a mobile computing device that includes a camera, a camera viewer, where an aspect ratio of the camera viewer matches an aspect ratio of a placeholder of a predefined greeting card template. The method also includes capturing, via the camera of the mobile computing device, a photograph at a first resolution, where an aspect ratio of the captured photograph matches the aspect ratio of the placeholder of the greeting card template. The method further includes recording, via the camera of the mobile computing device, a video at a second resolution that is lower than the first resolution, where an aspect ratio of the recorded video matches the aspect ratio of the placeholder of the greeting card template. The method further includes uniquely associating the recorded video with the captured photograph, and presenting a preview of the captured photograph on the display screen of the mobile computing device. The method further includes transmitting, for receipt by a remote computer system, the captured photograph at the first resolution, the recorded video at the second resolution, and an indication of the unique association between the captured photograph and the recorded video, via a transmitter of the mobile computing device.

Implementations may include one or more of the following. The presenting the preview of the captured photograph can include presenting a preview of a greeting card that includes the captured photograph, where the greeting card is based on the greeting card template. The video can include a plurality of individual frames of the video, and the captured photograph can be different from each frame of the plurality of individual frames of the video. The photograph can be captured before the video is recorded. The display screen can have an aspect ratio of about 16:9 and the camera viewer can have an aspect ratio in a range of about 1:1 to about 1.3:1.

In a third general aspect, a computer-implemented method of acquiring electronic content for an augmented reality greeting card includes presenting, on a display screen of a mobile computing device that includes a camera, a camera viewer, where an aspect ratio of the camera viewer matches an aspect ratio of a placeholder of a predefined greeting card template. The method also includes capturing, via the camera of the mobile computing device, a photograph at a first resolution, where an aspect ratio of the captured photograph matches the aspect ratio of the placeholder of the greeting card template. The method further includes recording, via the camera of the mobile computing device, a video at a second resolution that is lower than the first resolution, where an aspect ratio of the recorded video matches the aspect ratio of the placeholder of the greeting card template, and where the video includes a plurality of individual frames of the video, and the captured photograph is different from each frame of the plurality of individual frames of the video. The photograph is captured before the video is recorded. The method further includes uniquely associating the recorded video with the captured photograph, and presenting a preview of a greeting card on the display screen of the mobile computing device, where the greeting card is based on the greeting card template and includes the captured photograph. The method further includes transmitting, for receipt by a remote computer system, the captured photograph at the first resolution, the recorded video at the second resolution, and an indication of the unique association between the captured photograph and the recorded video, via a transmitter of the mobile computing device.

Implementations may include one or more of the following. The display screen can have an aspect ratio of about 16:9 and the camera viewer can have an aspect ratio in a range of about 1:1 to about 1.3:1. The camera viewer can occupy an area of the display screen that is less than an entire area of the display screen.

Other features, objects, and advantages of the technology described in this document will be apparent from the description and the drawings, and from the claims.

BRIEF DESCRIPTION OF THE DRAWINGS

FIG. 3 depicts an example mobile computing device displaying a screen shot of an example user interface through which a user may select to create an augmented reality greeting card or scan an augmented reality greeting card.

FIG. 4 depicts an example mobile computing device displaying a screen shot of an example user interface 310 through which a user may initiate capture of a photograph and recording of a video for an augmented reality greeting card.

FIGS. 5A and 5B depict an example mobile computing device displaying screen shots of example user interfaces through which a user may monitor capturing of a photograph and recording of a video, respectively, for an augmented reality greeting card.

FIG. 6 depicts an example mobile computing device displaying a screen shot of an example user interface through which a user may preview a recorded video for an augmented reality greeting card.

FIG. 7 depicts an example mobile computing device displaying a screen shot of an example user interface through which a user may select to save the captured photograph and recorded video.

FIG. 12 depicts an example mobile computing device displaying a screen shot of an example user interface through which a user may select to order a greeting card.

FIGS. 13-16 depict an example mobile computing device displaying screen shots of example user interfaces through which a user may provide order details.

FIG. 18 depicts an example mobile computing device displaying a screen shot of an example user interface, through which a user may initiate scanning of a greeting card or a portion (e.g., a photograph) of the greeting card.

FIG. 19 depicts an example mobile computing device displaying a screen shot of an example user interface that can be used to present an augmented reality experience.

Like reference symbols in the various drawings indicate like elements.

DETAILED DESCRIPTION

Figure 1A:
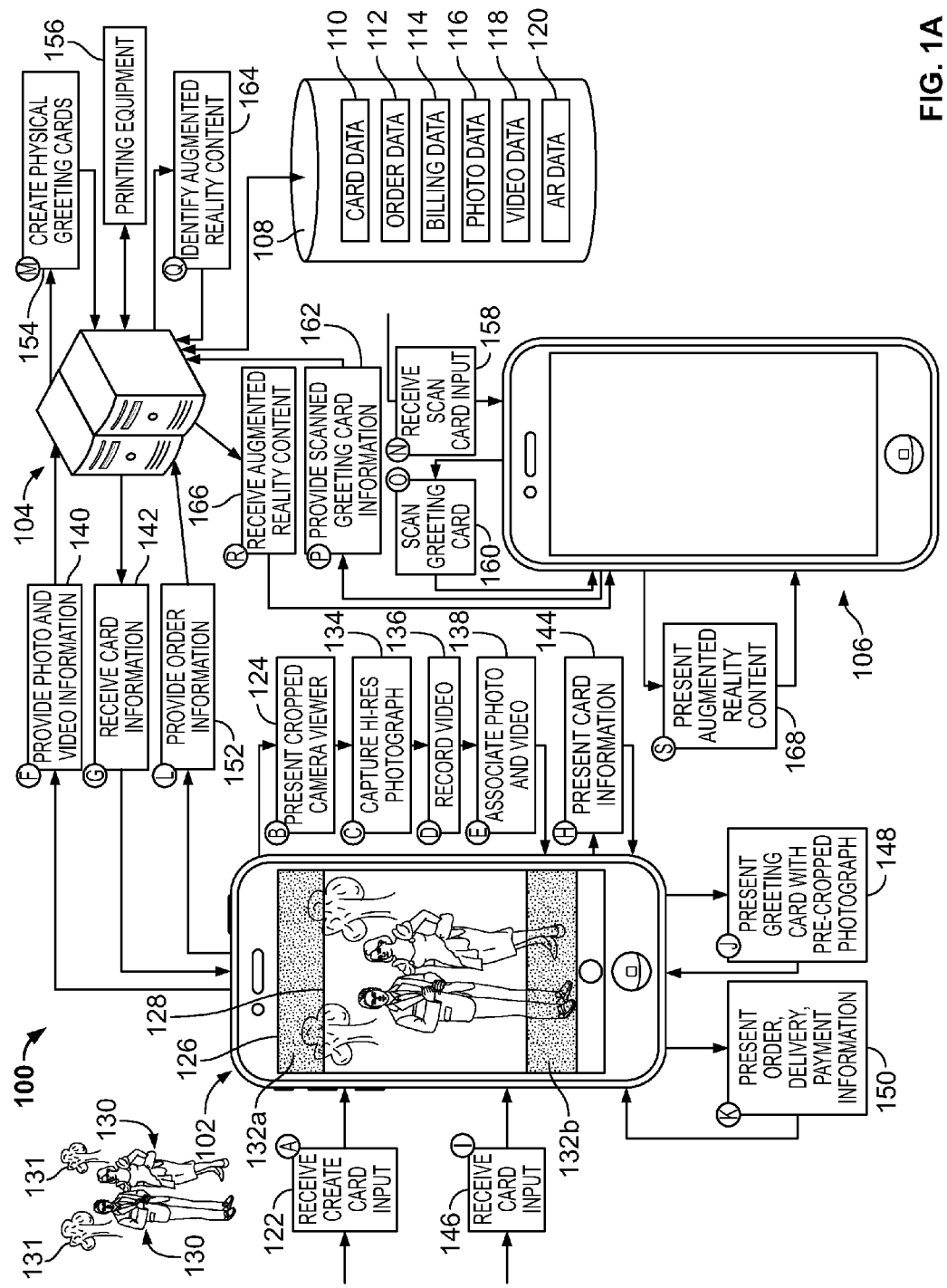
FIG. 1A is a conceptual diagram of an example system that can be used to create and present an augmented reality greeting card.

Described herein are systems, devices, and techniques for creating a greeting card that includes, or is associated with, an augmented reality feature. For example, the systems, devices, and techniques described herein may be used to create a greeting card that includes one or more photographs or images that may be augmented or supplemented by computer-generated sensory input such as audio, video, graphics, or a combination of the foregoing. Also described herein are systems, devices, and techniques for identifying, based on the greeting card or a portion of the greeting card, augmented reality content and presenting an augmented reality experience that includes the augmented reality content.

Some examples of the systems, devices, and techniques described herein can facilitate creation of an augmented reality greeting card by capturing a photograph to be included on the greeting card, and by recording a video to be associated with the photograph and presented to a recipient of the greeting card. Presentation of the video may supplement the physical greeting card and provide the recipient with an enhanced user experience, according to some implementations.

In some examples, the systems, devices and techniques described herein can be used to present, on a display screen of a mobile computing device and in place of a traditional camera viewer for the mobile computing device, a cropped camera view that is configured to fit a pre-existing greeting card template. For example, the cropped camera view may include an aspect ratio that matches an aspect ratio of a placeholder, such as a placeholder for a photograph, of the greeting card template. In some examples, the aspect ratio is approximately 1:1. In some examples, the aspect ratio is within a range of about 1:1 to about 1.2:1 (or 1:1.2). In some examples, the aspect ratio is within a range of about 1:1 to about 1.3:1 (or 1:1.3). In some examples, the aspect ratio is within a range of about 1:1 to about 1.4:1 (or 1:1.4). In some examples, the aspect ratio is within a range of about 1:1 to about 1.5:1 (or 1:1.5). Because the cropped camera view may include a matching aspect ratio as compared to an aspect ratio of a photograph placeholder of a greeting card template, a user of the mobile computing device may be better able to understand and appreciate how a photograph or video captured or recorded by the mobile computing device may appear on the greeting card or may be presented with the augmented reality experience, according to some implementations. In some examples, the cropped camera view may include a size, aspect ratio, or one or more dimensions that match a size, aspect ratio, or one or more dimensions of a photograph placeholder of the greeting card template.

In some examples, upon receipt of an input, such as a "create card" input, the cropped view of the camera may be presented on the display screen of the device. Upon receipt of an input, such as a "start" input, the camera may capture a high-resolution photograph of a subject, and may then record a video of the subject, where the photograph and video are each cropped to match the aspect ratio of the photograph placeholder of the greeting card template. The resolution of the photograph may be higher than the resolution of the video, for example, and may be a high-resolution or high-definition photograph. A physical greeting card that includes the captured high-resolution photograph may be created, where an aspect ratio of the photograph on the greeting card matches the aspect ratio of the cropped camera viewer, for example.

The augmented reality content can include audio, video, graphics, or a combination of the foregoing (e.g., audio and video), and a mobile computing device can present the content as an augmented reality experience. In some examples, the presented augmented reality experience can additionally include presentation of a view of a static image, such as a view of the greeting card. In some examples, following an initial presentation of the greeting card, the augmented reality presentation can include presentation of a video that appears to "pop" or spring from a photograph on the greeting card. In some examples, the video can include audio.

FIG. 1A is a conceptual diagram of an example system 100 that can be used to create and present an augmented reality greeting card. The system 100 includes an example first mobile computing device 102, such as a smartphone, tablet computing device or other appropriate mobile computing device, which can be used to facilitate creation of the augmented reality greeting card. For example, the first mobile computing device 102 can use a camera of the first mobile computing device to capture a photograph of a greeting card subject at a first resolution, and to record a video of the greeting card subject at a second resolution. In some examples, the first resolution is higher than the second resolution, and the photograph is a high-resolution photograph or high-definition photograph. In some examples, the photograph is captured separately from the video. In some examples, the camera takes the photograph before the camera begins to record the video. In some example, the photograph is captured independently of the recording of the video, and the photograph does not correspond to any individual frame of the video.

In some examples, a cropped view of the camera can be presented on a display screen of the first mobile computing device 102 to provide a user of the first mobile computing device 102 with an accurate representation of one or more of the size, aspect ratio, dimensions, scope, or coverage of a photograph or video to be associated with the augmented reality greeting card. The cropped view of the camera may include an aspect ratio that corresponds to (for example, matches) an aspect ratio of a placeholder for the greeting card, such as a placeholder for a photograph to be included with the greeting card, for example. In some examples, the cropped view of the camera may be sized and/or dimensioned to correspond to a size or dimension(s) of a placeholder for the greeting card, such as a placeholder for a photograph to be included with the greeting card, for example. In some examples, the cropped view may occupy a portion or subset of the display screen of the mobile computing device 102 that is less than the entire display screen of the mobile computing device 102, and may not occupy the entire display screen of the mobile computing device 102. In some examples, the cropped view may have an aspect ratio of approximately 1:1.

The example system 100 also includes an example computer system 104 that serves, receives, and manages greeting card information, augmented reality experience information, and order, billing, and delivery information for the system 100, according to some implementations. The computer system 104 can include one or more computing devices, such as a computer server system with one or more computer servers, a shared server system, a dedicated server system, a cloud computing system, a desktop computer, a laptop computer, or any combination thereof. The example system 100 further includes a second example mobile computing device 106, such as a smartphone, tablet computing device or other appropriate mobile computing device, which can be used to present an augmented reality experience, for example.

The computer system 104 can be used by users via client computing devices, such as the first and second mobile computing devices 102, 106 in some examples. Mobile computing device 102 or mobile computing device 106 may receive information transmitted by the computer system 104, and similarly either of the mobile computing devices 102, 106 may transmit information for receipt by the computer system 104. For example, the computer system 104 can provide to a mobile computing device, or receive from a mobile computing device, greeting card feature or parameter information, greeting card order information, greeting card delivery information, billing or payment information, augmented reality information, information relating to a photograph to be included on a greeting card, information relating to a video to be used for an augmented reality presentation, information associating a photograph with a video, or other appropriate information that can be used to create an augmented reality greeting card or to present an augmented reality experience.

The second example mobile computing device 106 can be used to scan a greeting card or portion of a greeting card (e.g., a photograph on the greeting card) and present an augmented reality experience, according to some implementations. For example, a recipient of a greeting card may use the second mobile computing device 106 to scan a photograph on the greeting card, transmit information relating to the scanned photograph to the computer system 104, receive augmented reality information (e.g., a video associated with the photograph and information relating to presenting the video) from the computer system 104, and may present an augmented reality experience on a display screen of the second mobile computing device 106. In some examples, the second mobile computing device 106 can present, on its display screen, a view of the greeting card that includes the photograph, and then can present the video that is associated with the photograph such that the video appears to "pop" from the photograph. For example, the video may be presented in a relation to the photograph on the greeting card, whereby the subject or subjects of the video may initially be positionally aligned with the subject or subjects of the photograph such that when the video begins to play, the presentation provides the impression to a viewer that the subject or subjects of the photograph of the greeting card spring to life.

The computer system 104 can access an electronic storage repository 108, which may be used to store greeting card data 110, order data 112, billing data 114, photo or image data 116, video data 118, and augmented reality experience data 120. Greeting card data 110 can include greeting card theme information, style information, template information, size information, content information, photograph placeholder information, and the like. Order data 112 can include quantity information, pricing information, promotional code or coupon information, delivery information, address information, and the like. Billing data 114 can include merchant information, credit card information, electronic payment information, bank information, payment processor information, customer information, and the like. Photo data 116 can include electronic representations of photographs, such as photographs received by the computer system 104 from the first mobile computing device 102. Video data 118 can include video files that can be used in augmented reality presentations, such as video files received by the computer system 104 from the first mobile computing device 102. Augmented reality experience data 120 can include information that a computing device, such as the second mobile computing device 106, can use to present the augmented reality content for the augmented reality experience. Information such as how and where to position the video on the display screen of the second mobile computing device 106, or how and where to position the video in the view with respect to a position of the greeting card or a portion of the greeting card (e.g., the photograph) can be included in the augmented reality experience data 120. In some examples, some or all of repository 108 is included in computer system 104, and in some examples repository 108 is external from computer system 104.

Example steps A-M, which are depicted as being performed across the first mobile computing device 102 and the computer system 104, are an example of steps that can be used to facilitate creation of an augmented reality greeting card. As described above, mobile computing device 102 may be a smartphone or a tablet computing device, but more generally can be any of a variety of appropriate computing devices that include a camera capable of capturing or taking a photograph and capturing or recording a video. Examples of alternative devices can include a personal digital assistant, a laptop computer, a desktop computer, a wearable computing device (e.g., a smart-watch or a smart-bracelet), or other appropriate computing devices. The mobile computing device 102 can communicate with the computer system 104 over one or more appropriate communication networks, such as the Internet, or one or more local area networks (LANs), wide area networks (WANs), cellular networks, virtual private networks (VPNs), wireless networks (e.g., Wi-Fi networks, mobile data networks (e.g., 3G/4G networks)), wired networks (e.g., fiber optic networks), other appropriate network, or any combination thereof.

As indicated by step A (122), the first mobile computing device 102 can receive a create card input. The create card input may be provided by a user of the first mobile computing device 102, as by selection of a user interface feature, for example, and may indicate that the user desires to create an augmented reality greeting card.

As indicated at step B (124), the first mobile computing device 102 can present, on a display screen 126 of the mobile computing device 102, a cropped camera viewer 128. The camera feature of the first mobile computing device 102 may launch or open in response to receipt of the create card input, according to some implementations, but the traditional camera viewer that occupies all or substantially all of the display screen 126 of the device 102 may be replaced by the cropped camera viewer 128. The mobile computing device 102 includes one or more camera lenses, including a lens on the side of the device opposite the display screen 126, and the cropped camera viewer 128 provides a view of images captured by one or more of the lenses (e.g., the lens on the side of the device opposite the display screen 126).

As can be seen in FIG. 1, the cropped camera viewer 128 occupies an area or portion of the display screen that is less than the entire display screen 126. As will be described further below, a portion of the display screen may be blacked-out, greyed-out or shaded, for example, and a portion of the display screen may be used to display one or more camera control features. In some examples, the cropped camera viewer 128 occupies less than about three-quarters (e.g., less than about 75%) of the entire display screen; in some examples, the cropped camera viewer 128 occupies less than about 60% of the entire display screen; in some examples, the cropped camera viewer 128 occupies less than about half (e.g., less than about 50%) of the area of the entire display screen 126. In some examples, the cropped camera viewer 128 occupies an area that is about half of the area of the entire display screen 126. The cropped camera viewer 128 may be configured to include one or more of a size, area, aspect ratio, shape, scope, coverage, or one or more dimensions that correspond to or match a corresponding parameter of a placeholder, such as a photograph placeholder, of a greeting card template. In some examples, the aspect ratio of the cropped camera viewer 128 is about 1:1, and an aspect ratio of a photograph placeholder of a corresponding greeting card template is about 1:1. In some examples, the dimensions of the cropped camera viewer 128 are about 4.5 cm×4.5 cm (1350 pixels×1350 pixels). In some examples, the dimensions of the cropped camera viewer 128 are about 4.0 cm×4.0 cm. In some examples, the aspect ratio of the cropped camera viewer 128 is about 1.1:1 (or 1:1.1), and an aspect ratio of the photograph placeholder of the corresponding greeting card template is about 1.1:1 (or 1:1.1). In some examples, the aspect ratio of the cropped camera viewer 128 is about 1.2:1 (or 1:1.2), and an aspect ratio of the photograph placeholder of the corresponding greeting card template is about 1.2:1 (or 1:1.2). In some examples, the aspect ratio of the cropped camera viewer 128 is about 1.3:1 (or 1:1.3), and an aspect ratio of the photograph placeholder of the corresponding greeting card template is about 1.3:1 (or 1:1.3). In some examples, the aspect ratio of the cropped camera viewer 128 is about 1.4:1 (or 1:1.4), and an aspect ratio of the photograph placeholder of the corresponding greeting card template is about 1.4:1 (or 1:1.4). In some examples, the aspect ratio of the cropped camera viewer 128 is about 1.5:1 (or 1:1.5), and an aspect ratio of the photograph placeholder of the corresponding greeting card template is about 1.5:1 (or 1:1.5).

A user of the first mobile computing device 102 may wish to create a greeting card that includes a photograph of one or more subjects 130. In the example of FIG. 1, two people are shown as subjects 130, and they are standing in front of two trees 131. The user may orient the first mobile computing device 102 so that the subjects 130 appear in the cropped camera viewer 128. As can be seen in FIG. 1, the display screen 126 may depict one or more shaded or greyed-out portions 132 of the display in relation to the cropped camera viewer 128. A first shaded or greyed-out portion 132a is shown above the cropped camera viewer 128, and a second shaded or greyed-out portion 132b is shown below the cropped camera viewer 128. In the example of FIG. 1A, the cropped camera viewer 128 extends across the entire width of the display screen 126 of the first mobile computing device 102, but does not extend across the entire length (e.g., height) of the display screen 126 of the first mobile computing device 102. For example, the first and second shaded or greyed-out portions 132*a*, 132*b* are displayed on the display screen concurrently with the cropped camera viewer 128. In other examples, the cropped camera viewer 128 may not extend across the entire width of the display screen 126, and the one or more shaded or greyed-out portions 132*a*, 132*b* may be replaced by a shaded or greyed-out portion that surrounds a periphery of the cropped camera viewer 128, for example.

In some examples, portions of the subjects 130 and surrounding environment may be visible, albeit in a greyed-out fashion, in the greyed-out portions 132. For example, as can be seen in FIG. 1, portions of the trees 131 (e.g., the top portions of the trees 131) are visible at a reduced visibility (e.g., when compared to a visibility within the cropped camera viewer 128) in the shaded or first greyed-out portion 132*a*, and portions of the subjects 130 (e.g., the subjects' feet and lower legs) are visible at a reduced visibility in the second shaded or grey-out portion 132*b*. In some examples the portions of the subjects 130 and surrounding environment may not be visible and the depicted greyed-out portion 132 and may be blacked-out (not shown in FIG. 1A), for example.

Figure 1C:
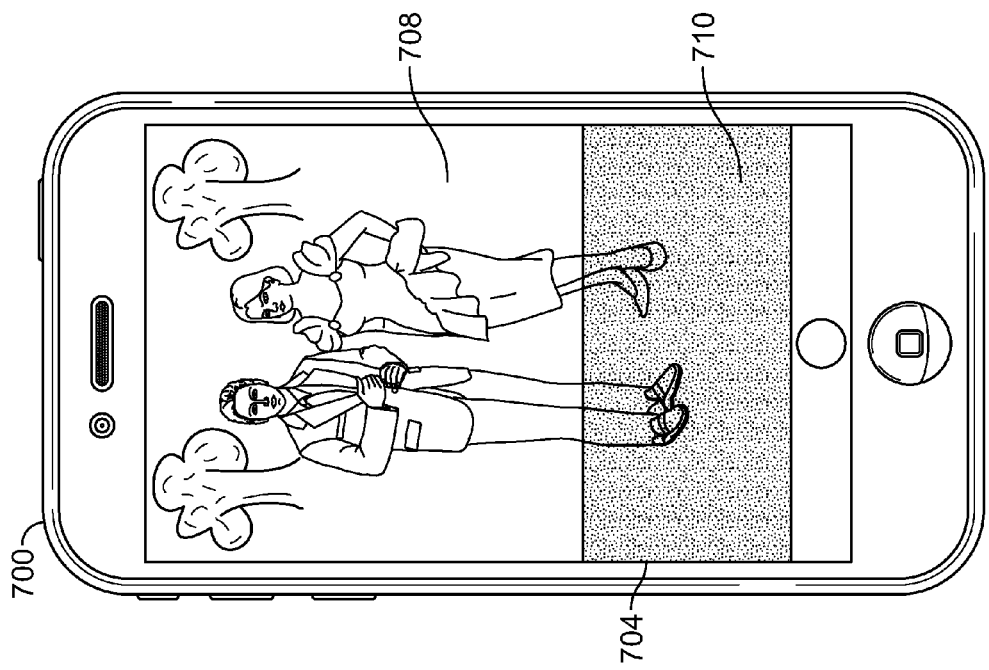
FIGS. 1B, 1C, and 1D are conceptual diagrams of various example cropped camera viewers, presented on display screens of example mobile computing devices, each configured to match a placeholder of a corresponding greeting card template.
Figure 1B:
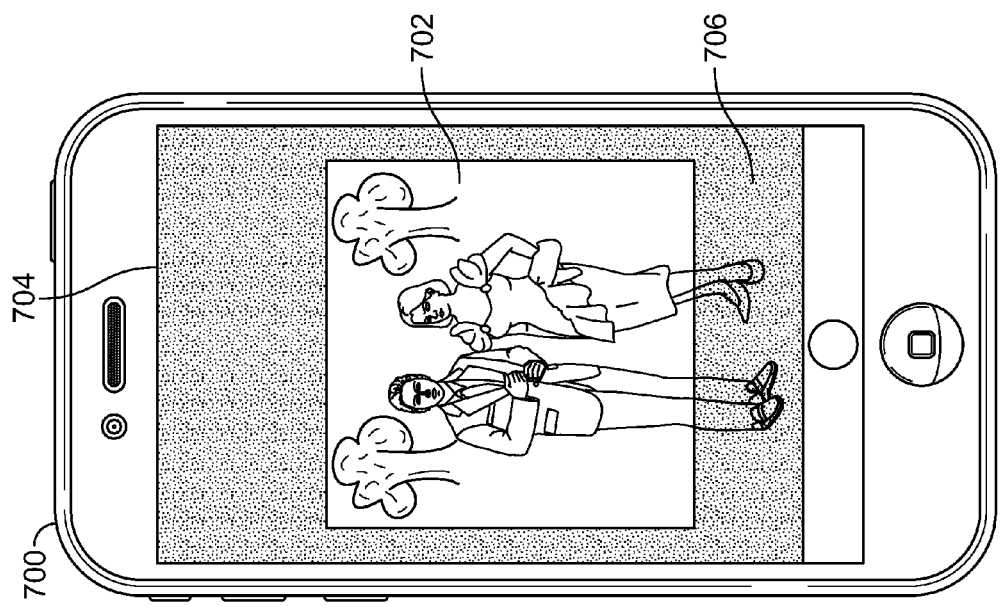
Figure 1D:
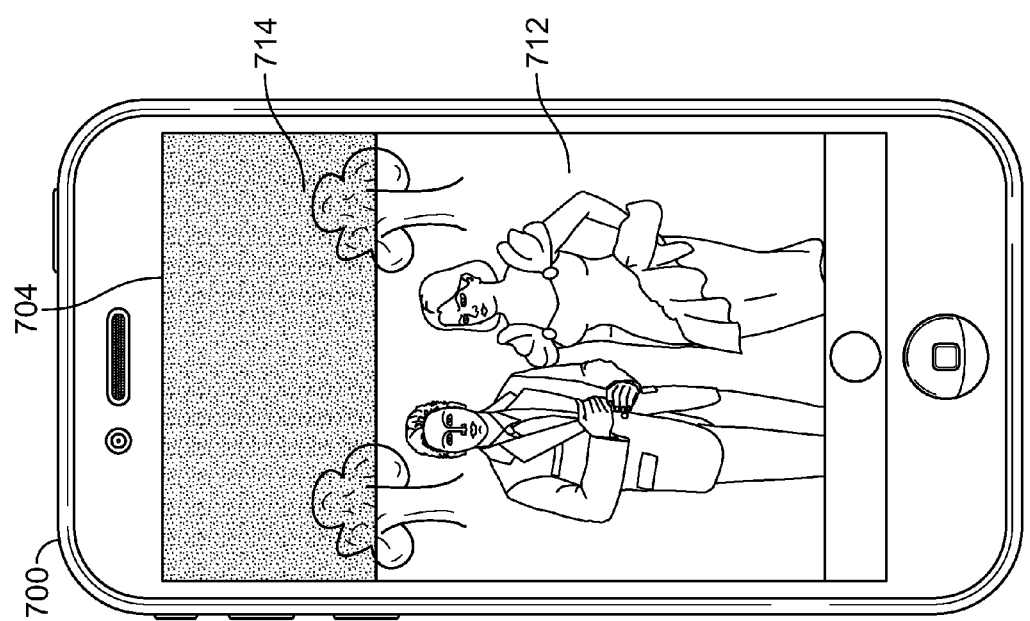

FIGS. 1B, 1C, and 1D are conceptual diagrams of various example cropped camera viewers, presented on display screens of example mobile computing devices, each configured to match a placeholder of a corresponding greeting card template. FIG. 1B depicts an example mobile computing device 700 presenting a cropped camera viewer 702 on a display screen 704 of the device 700. The cropped camera viewer 702 may include one or more of an aspect ratio, shape, size, dimension or dimensions, scope, or coverage that matches a corresponding parameter of a placeholder (e.g., a photograph placeholder) of a greeting card template. In this example, the aspect ratio of the cropped camera viewer 702 may be about 1:1. In other examples, the aspect ratio may be about 1.1:1, 1.2:1, 1.3:1, 1.4:1, or 1.5:1. A shaded or grey-out portion 706, in this example, surrounds a periphery of the cropped camera viewer 702. In this example, the shaded or greyed-out portion 706 is located above, below, to the left, and to the right of the cropped camera viewer 702. The portion 706 can provide a reduced visibility view, when compared with the view of the cropped camera viewer 702, of the subjects or surrounding environment that are the focus of the to-be-captured photograph or video. In some examples, the portion 706 may be blacked out rather than shaded.

FIG. 1C depicts the mobile computing device 700 presenting a cropped camera viewer 708 on the display screen 704 of the device 700. The cropped camera viewer 708 may include one or more of an aspect ratio, shape, size, dimension or dimensions, scope, or coverage that matches a corresponding parameter of a placeholder (e.g., a photograph placeholder) of a greeting card template. In this example, the cropped camera viewer 708 is presented at or near the top of the display screen 704, and the aspect ratio of the cropped camera viewer 708 may be about 1:1. In other examples, the aspect ratio may be about 1.1:1, 1.2:1, 1.3:1, 1.4:1, or 1.5:1. A shaded or grey-out portion 710, in this example, is shown below the cropped camera viewer 708. The portion 710 can provide a reduced visibility view, when compared with the view of the cropped camera viewer 708, of the subjects or surrounding environment that are the focus of the to-be-captured photograph or video. In some examples, the portion 710 may be blacked out.

FIG. 1D depicts the mobile computing device 700 presenting a cropped camera viewer 712 on the display screen 704 of the device 700. The cropped camera viewer 712 may include one or more of an aspect ratio, shape, size, dimension or dimensions, scope, or coverage that matches a corresponding parameter of a placeholder (e.g., a photograph placeholder) of a greeting card template. In this example, the cropped camera viewer 712 is presented at or near the bottom of the display screen 704, and the aspect ratio of the cropped camera viewer 712 may be about 1:1. In other examples, the aspect ratio may be about 1.1:1, 1.2:1, 1.3:1, 1.4:1, or 1.5:1. A shaded or grey-out portion 714, in this example, is shown above the cropped camera viewer 712. The portion 714 can provide a reduced visibility view, when compared with the view of the cropped camera viewer 712, of the subjects or surrounding environment that are the focus of the to-be-captured photograph or video. In some examples, the portion 714 may be blacked out.

Referring again to FIG. 1A, as indicated at step C (134), the first mobile computing device 102 can capture or take a photograph. In some examples, the photograph may be a high-resolution photograph. In some examples, the photograph may be a high-definition photograph. In some examples, the resolution of the photograph may be the highest resolution supported by the camera of the first mobile computing device 102. The photograph may include one or more of a size, area, aspect ratio, shape, scope, coverage, or one or more dimensions that correspond to or match a placeholder, such as a photograph placeholder, of a greeting card template, and which also match the corresponding parameter of the cropped camera viewer 128. In some examples, the aspect ratio of the photograph is about 1:1. In other examples, the aspect ratio may be about 1.1:1, 1.2:1, 1.3:1, 1.4:1, or 1.5:1. In some examples, the dimensions of the photograph are about 4.5 cm×4.5 cm (1350 pixels×1350 pixels). In some examples, the dimensions of the photograph are about 4.0 cm×4.0 cm.

In some examples, the photograph may be captured in response to an input received by the first mobile computing device 102, such as a start input (e.g., provided by the user of the device via a user interface feature). In some examples, the first mobile computing device 102 may take a single photograph. In some examples, the first mobile computing device 102 may take multiple (e.g., 2, 3, 4, 5, 6, 7, 8, or more) photographs. The captured photograph (e.g., an electronic representation of the photograph) may be stored in a memory location of the first mobile computing device 102.

As indicated at step D (136), the first mobile computing device 102 can record a video. In some examples, a resolution of the video may be lower than the resolution of the photograph captured at step C (134). For example, the resolution of the video may be about 720 pixels×720 pixels. In some examples, the photograph captured at step C (134) may be different from any of the individual frames of the video recorded at step D (136). In some examples, the video may be recorded at step D (136) after the photograph has been captured or taken at step C (134). The video may include one or more of a size, area, aspect ratio, shape, scope, coverage, or one or more dimensions that correspond to or match a placeholder, such as a photograph placeholder, of a greeting card template, and which also match the corresponding parameter of the cropped camera viewer 128. In some examples, the aspect ratio of the video is about 1:1. In other examples, the aspect ratio may be about 1.1:1, 1.2:1, 1.3:1, 1.4:1, or 1.5:1. In some examples, the dimensions of the video are about 4.5 cm×4.5 cm (1350×1350). In some examples, the dimensions of the video are about 4.0 cm×4.0 cm. The recorded video file may be stored in a memory location of the first mobile computing device 102.

As indicated at step E (138), the first mobile computing device 102 can associate the recorded video with the captured photograph. For example, a link (e.g., an electronic link) may be established between the captured photograph and the recorded video. In some examples, the recorded video may be uniquely associated with the captured photograph, for example as provided by the link between the captured photograph and the recorded video. As an alternative example of association, the captured photograph and the recorded video can be included in a single file structure, while in other examples the captured photograph and the recorded video can be represented by separate files structures. In some examples, the recorded video and the captured photograph can be uniquely associated with one another based on a naming convention. For example, the photo and video may be provided a common prefix, suffix, extension, name or portion of a name, or the like. In some examples, the captured photograph and the recorded video may be stored in the same folder, or may be transmitted to the computer system 104 as part of a same message or group of messages (or message packets or payloads, e.g.), or in the same application program interface (api), which may provide additional alternatives for associating the captured photograph and the recorded video.

As indicated at step F (140), the first mobile computing device 102 can provide the captured photograph and the recorded video to the computer system 104. For example, the first mobile computing device 102 may transmit, for receipt by the computer system 104, the captured photograph and the recorded video. In some examples, in addition to providing the captured photograph and the recorded video, the first mobile computing device 102 provides additional information, such as information regarding the association of the captured photograph with the recorded video, or additional information regarding the captured photograph, the recorded video, the first mobile computing device 102 or an account associated with the first mobile computing device.

As indicated at step G (142), the first mobile computing device 102 can receive card information from the computer system 104. In some examples, the card information can include information pertaining to one or more greeting cards. For example, the card information can include information regarding one or more greeting card themes (e.g., birthday, anniversary, thank-you, sympathy, congratulations, invitation, holiday, and the like). The card information can include information regarding one or more greeting card templates (e.g., one or more birthday card template options, one or more anniversary card template options, one or more thank-you card template options, one or more sympathy card template options, one or more congratulations card template options, one or more invitation card template options, one or more holiday card template options, and the like). The card information can include information relating to ordering greeting cards, information relating to delivery of greeting cards, and information relating to payments, according to some examples.

As indicated at step H (144), the first mobile computing device 102 can present card information on the display 126 of the device. For example, the first mobile computing device 102 may present greeting card theme information, such as a selection of various greeting card theme options. In some examples, the first mobile computing device 102 may receive a greeting card theme input, which may be provided by the user by selecting a user interface feature, for example. In some examples, the first mobile computing device 102 may present greeting card template information, such as a selection of various greeting card template options. In some examples, the presented templates may include a placeholder, such as a photograph placeholder where a captured photograph may be inserted or positioned. The greeting card templates may be based on the selected greeting card theme, according to some examples. In some examples, the first mobile computing device 102 may receive a greeting card template input, which may be provided by the user by selecting a user interface feature, for example. One or more inputs that the first mobile computing device 102 may receive (e.g., theme input, template input, other inputs) are represented by step I (146). For example, the first mobile computing device 102 may receive an input to select a holiday theme, and may receive an input to select a brown-colored winter holiday greeting card template.

As indicated at step J (148), the first mobile computing device 102 can present, on the display screen 126, the selected greeting card template with the pre-cropped, high-resolution photograph that was captured at step C (134). The pre-cropped, high-resolution photograph may occupy the position of the placeholder of the template, for example. In some examples, the first mobile computing device 102 may receive card edit information (not shown in FIG. 1A), such as text that the user wishes to add to the greeting card (e.g., "We wish you all the best for 2015"), and may display the received text on the displayed greeting card.

As indicated at step K (150), the first mobile computing device 102 can present greeting card ordering information, delivery information, and payment information on the display 126 of the device, and may receive one or more inputs related to the ordering information, delivery information and payment information (not shown in FIG. 1A). Examples of ordering information that may be presented, and for which inputs may be received, can include information relating to a quantity of greeting cards to be ordered, promotional code or coupon information, pricing information, upgrade or option information, or greeting card type or style information (e.g., physical greeting card or electronic greeting card). Examples of delivery information that may be presented, and for which inputs may be received, can include information relating to a delivery method (e.g., Ground, Next-day delivery, Two-day delivery, and the like), address information, such as a delivery address for a recipient of the greeting card, or options for providing delivery or contact information, such as by entering address information or an option to search a contact database of the first mobile computing device and use an address of a selected contact. Examples of payment information that may be presented, and for which inputs may be received, can include a credit card number and associated information, a bank or deposit account number and associated information, payment processor and related information, or other information related to paying for an order of augmented reality greeting cards.

As indicated at step L (152), the first mobile computing device 102 can provide order information to the computer system 104. For example, the first mobile computing device 102 may provide to the computer system 104 information including ordering information, delivery information, and payment information received at step K (150). The computer system 104 may receive the provided information, and may store the information in repository 108.

As indicated at step M (154), the computer system 104 can cause the physical greeting cards to be created. While computer system 104 is depicted in FIG. 1A as a single system, in some examples computer system 104 may represent two or more systems, including two or more systems located remotely from one another. For example, one of the computer systems represented by computer system 104 may generally perform functions associated with augmented reality aspects of the augmented reality presentation, while another of the computer systems represented by computer system 104 may generally perform functions associated with the physical greeting cards and their creation. Regarding creating the physical greeting cards, the computer system 104 may interface with printing equipment 156. The physical greeting cards may be delivered to intended recipients of the greeting cards.

Example steps N-S, which are depicted as being performed across the second mobile computing device 106 and the computer system 104, are an example of steps that can be used to provide an augmented reality experience. As described above, mobile computing device 106 may be a smartphone or a tablet computing device, but more generally can be any of a variety of appropriate computing devices that include a camera capable of capturing or taking a photograph, or that are capable of scanning a card or a photograph. Examples of alternative devices can include a personal digital assistant, a laptop computer, a desktop computer, a wearable computing device (e.g., a smart-watch or a smart-bracelet), or other appropriate computing devices. The mobile computing device 106 can communicate with the computer system 104 over one or more appropriate communication networks, such as the Internet, or one or more local area networks (LANs), wide area networks (WANs), cellular networks, virtual private networks (VPNs), wireless networks (e.g., Wi-Fi networks, mobile data networks (e.g., 3G/4G networks)), wired networks (e.g., fiber optic networks), other appropriate network, or any combination thereof.

As indicated in step N (158), the second mobile computing device 106 can receive a scan card input. The scan card input may be provided by a user of the second mobile computing device 106, as by selection of a user interface feature, for example, and may indicate that the user desires to scan an augmented reality greeting card in anticipation of being presented an augmented reality experience.

As indicated at step O (160), the second mobile computing device 106 can scan a greeting card, or a portion of the greeting card (e.g., a photograph of the greeting card). In some examples, the second mobile computing device 106 takes a photograph of the greeting card or a portion of the greeting card. In some examples, the second mobile computing device 106 scans and recognizes or identifies a portion of the greeting card (e.g., recognizes or identifies the photograph on the greeting card).

As indicated at step P (162), the second mobile computing device 106 can provide information relating to the scanned greeting card to the computer system 104. In some examples, the second mobile computing device 106 provides a photograph, which in some examples is captured at step O (160), of the greeting card or portion of the greeting card to the computer system 104. In some examples, the second mobile computing device 106 provides an indication of the recognition or identification of the photograph of the greeting card to the computer system 104.

As indicated at step Q (164), the computer system 104 can identify augmented reality content based on the received information relating to the scanned greeting card (received at step P, 162). For example, the computer system 104 can identify the photograph included on the greeting card (e.g., the photograph captured by the first mobile computing device 102 at step C (134) and provided to the computer system 104 at step F (140) and included on the greeting card), and can then identify, based on an association or link between the photograph and a video, the video that was associated with the photograph (e.g., the video recorded by the first mobile computing device 102 at step D (136), associated with the photograph at step E (138), and provided to the computer system 104 at step F (140)). The computer system 104 can retrieve the identified augmented reality content, for example from the repository 108. In some examples, prior to identifying the augmented reality content, the computer system 104 can analyze information received (e.g., a photograph of the greeting card or portion of the greeting card captured by second mobile computing device 106) from the second mobile computing device 106 at step P (162), and can recognize or identify a portion of the greeting card (e.g., recognize or identify the photograph on the greeting card). The computer system 104 can then use this information in identifying the augmented reality content, for example.

As indicated at step R (166), the second mobile computing device 106 can receive augmented reality content from the computer system 104. For example, the second mobile computing device 106 can receive the video file identified by the computer system 104 at step Q (164), and can receive information relating to presenting the augmented reality content, such as where to present the video with reference to the view of the greeting card.

As indicated at step S (168), the second mobile computing device 106 can present the augmented reality content. In some examples, the second mobile computing device 106 presents an augmented reality experience by presenting, on its display screen, a view of the greeting card and the photograph included on the greeting card, and then presents the video that is associated with the photograph such that the video appears to "pop" or spring from the photograph. For example, the video can be presented in a relation to the photograph on the greeting card, such that when the video begins to play the subject or subjects of the photograph on the greeting card appear to spring to life, where previously they had appeared stationary in the photograph.

Figure 2:
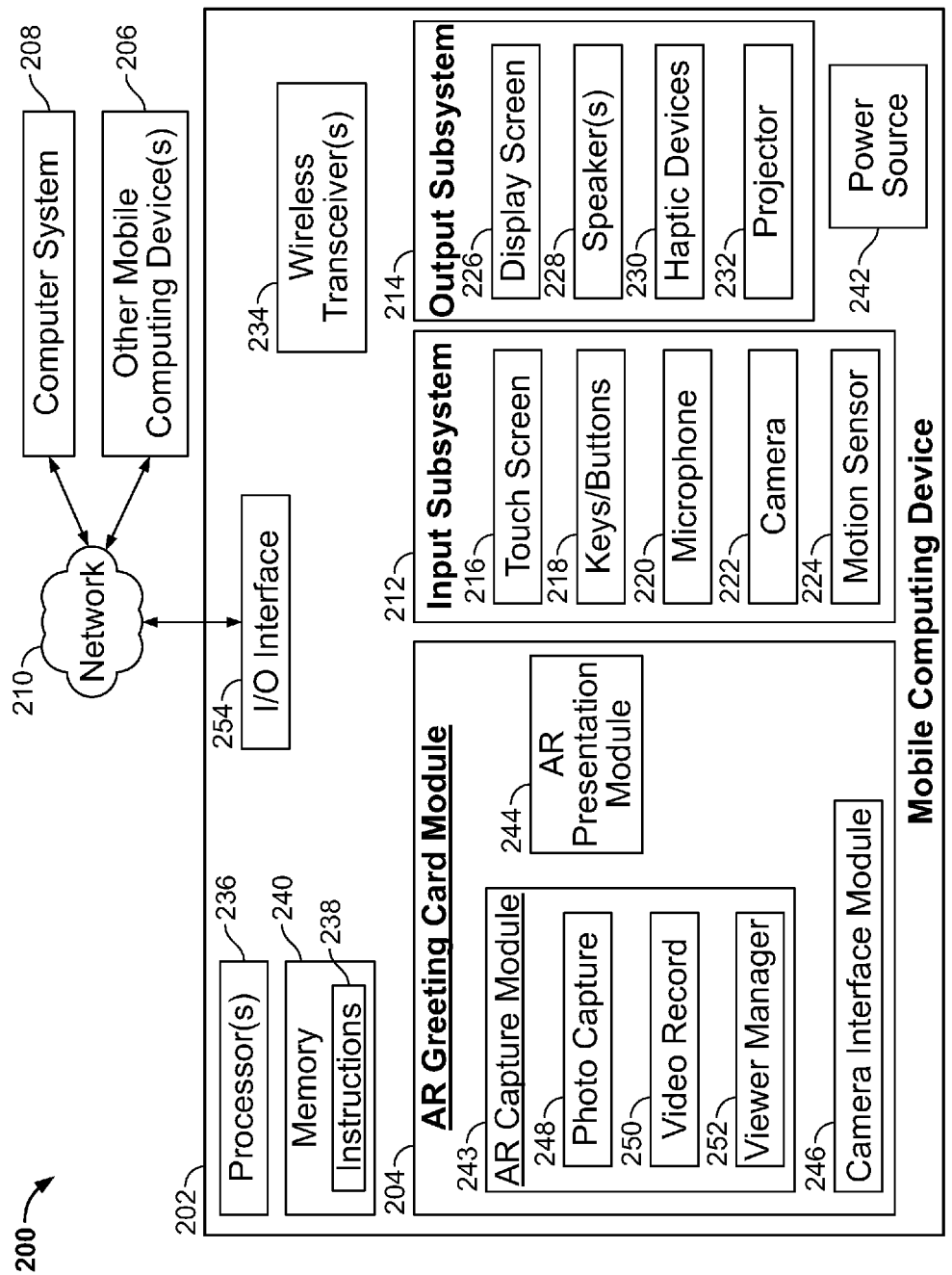
FIG. 2 is a conceptual diagram of an example system, including a block diagram of an example mobile computing device that includes an augmented reality greeting card module.

FIG. 2 is a conceptual diagram of an example system 200, including a block diagram of an example mobile computing device 202 that includes an augmented reality greeting card module 204. Mobile computing device 202 may correspond to any of the mobile computing devices discussed herein, and may be in various examples and without limitation, a smartphone, a tablet computing device, a laptop computer, a wearable computing device, a personal digital assistant, or other appropriate mobile computing device.

The example system 200 is depicted as including the mobile computing device 202, other mobile computing devices 206, one or more computer systems 208 associated with augmented reality greeting cards or related aspects, and a network 210. The mobile computing device 202 (as well as the other mobile computing devices 206) can be similar to the mobile computing device 102 (or device 106) described above with reference to FIG. 1A. The one or more computer systems 208 can be similar to the computer system 104 described above with reference to FIG. 1A. The network 210 can be one or more appropriate communication networks, such as the Internet, or one or more local area networks (LANs), wide area networks (WANs), cellular networks, virtual private networks (VPNs), wireless networks (e.g., Wi-Fi networks, mobile data networks (e.g., 3G/4G networks)), wired networks (e.g., fiber optic networks), other appropriate network, or any combination thereof.

The mobile computing device 202 includes an input subsystem 212 and an output subsystem 214 through which input can be received from users and output can be provided to users by the mobile computing device 202. The input subsystem 212 includes a touchscreen 216 (e.g., touch sensitive display, touch sensitive surface, touch sensitive housing, presence sensitive surface), keys and/or buttons 218, microphone(s) 220, one or more cameras 222 (e.g., rear-facing camera, forward-facing camera, 3D camera), motion sensors 224 (e.g., accelerometers, gyroscopes), and/or other appropriate technologies. The output subsystem 214 includes a display screen 226 (e.g., LCD display, LED display), one or more speakers 228, one or more haptic devices 230 (e.g., vibration generating devices, tactile displays), and in some examples, a projector 232, and/or other appropriate technologies. In some implementations, portions of the input and output subsystems 212 and 214 can be configured to provide additional inputs and outputs on the mobile computing device 202.

The mobile computing device 202 additionally includes one or more wireless transceivers 234 (e.g., one or more wireless transmitters and one or more wireless receivers) for communicating over one or more wireless communication technologies. For example, the wireless transceivers 234 can include one or more appropriate wireless transceivers, such as wireless radio transceivers like Wi-Fi transceivers, short-range wireless transceivers (e.g., BLUETOOTH transceivers), cellular network transceivers, NFC, and/or mobile data network transceivers (e.g., 3G/4G transceivers).

The mobile computing device 202 additionally includes one or more processors 236 (e.g., one or more CPU's, such as single core, dual core, quad core CPU's) configured to execute instructions 238 (e.g., binaries, object code, scripts) that are stored/loaded into memory 240 (e.g., RAM, ROM, Flash) of the mobile computing device 202. The one or more processors 236 can execute instructions of any of a variety of types to perform tasks at the computing device 202, including tasks or operations discussed herein with reference to mobile computing devices. The mobile computing device 202 can additionally include one or more power sources 242 (e.g., battery) or backup power sources, or power connections (e.g. to an outlet), or solar or other power inputs.

In some implementations, the AR greeting card module 204 includes an AR capture module 243, an AR presentation module 244, and a camera interface module 246. The camera interface module 246 interfaces with the camera 222, to make the camera 222 available for photograph-capture and video recording. The AR capture module 242 includes a photo capture module 248, a video record module 250, and a viewer manager 252. The photo capture module 248 can manage photograph capture for the AR capture module 242, such as to capture a photograph as described above with reference to step C (134) in FIG. 1A. The video record module 250 can manage video recording for the AR capture module 242, such as to record a video as described above with reference to step D (136) in FIG. 1A. The viewer manager 252 can present a cropped camera viewer, such as any of the cropped camera viewers described herein (e.g., viewers 128, 702, 708, 712, 312), for example in place of the traditional camera viewer that may be provided by the camera 222 in the absence of AR greeting card module 204 or when AR greeting card module 204 is not in use (such as when camera 222 is used to take photographs or record videos not intended for use with an AR greeting card, for example). In some examples, the viewer manager 252 is configured to present a pre-cropped camera viewer that includes one or more of a size, area, aspect ratio, shape, scope, coverage, or one or more dimensions that correspond to or match a placeholder, such as a photograph placeholder, of a greeting card template. The AR presentation module 244 can be used to present an augmented reality experience to a user, for example, such as described above with reference to step S (168) of FIG. 1A.

The mobile computing device 202 includes an input/output (I/O) interface 254 that is configured to communicate with other computing devices over the network 210. For example, mobile computing device 202 can use I/O interface 254 to communicate over network 210 with the one or more computer systems 208, with other mobile computing devices 206, or with other computing devices having access to network 210. The I/O interface 254 can be any of a variety of appropriate interfaces, such as a wired interface (e.g., Ethernet card) and/or wireless interface (e.g., wireless transceivers 234, wireless chips, and one or more antennas).

Although not depicted in FIG. 2, the mobile computing device 202 can include a data store that can be used to store information associated with capturing augmented reality content, presenting augmented reality content, ordering augmented reality greeting cards, and the like. Such information can be stored in memory 240 in some examples.

FIG. 3 depicts an example mobile computing device displaying a screen shot of an example user interface 300 through which a user may select to create an augmented reality greeting card or scan an augmented reality greeting card. User interface 300 may be presented on a display screen 303 of a mobile computing device 304. In some examples, mobile computing device 304 may correspond to the first mobile computing device 102 (see FIG. 1A). A user may select a first area 302 (labeled "Create A Pop Card") of the user interface 300 (indicated in FIG. 3 by the depicted hand selecting area 302), and the mobile computing device may receive the selection as a create card input. In response to receiving the create card input, the mobile computing device may present a cropped camera viewer for capturing a photograph and recording a video.

FIG. 4 depicts an example mobile computing device displaying a screen shot of an example user interface 310 through which a user may initiate capture of a photograph and recording of a video for an augmented reality greeting card. As can be seen in FIG. 4, presented on the display 303 of the mobile computing device 304 is a cropped camera viewer 312. In some examples, an aspect ratio of the cropped camera viewer 312 is about 1:1. In other examples, the aspect ratio may be about 1.1:1, 1.2:1, 1.3:1, 1.4:1, or 1.5:1. The cropped camera viewer 312 occupies an area or portion of the display screen 303 that is less than the entire display screen 303 or entire area of the display screen 303, in contrast, for example, to a camera viewer of a traditional smartphone that typically occupies the entire area of the display of the smartphone. In some examples, the cropped camera viewer 312 occupies an area of the display screen that is about half of the area of the entire display screen. In some examples, the cropped camera viewer 312 occupies an area of the display screen that is less than half of the area of the entire display screen.

In some examples, the cropped view 312 includes a size, aspect ratio, shape, or one or more dimensions that match a size, aspect ratio, shape, or one or more dimensions of a photograph placeholder of the greeting card template. For example, the cropped camera viewer 312 may be configured to have the same aspect ratio as the aspect ratio of a placeholder for a photograph for a greeting card or greeting card template. Because the aspect ratio of the cropped camera viewer 312 may match the aspect ratio of a photograph to be included on a greeting card, and of a video to be presented as an augmented reality experience of an augmented reality greeting card, the user of the mobile device 304 may enjoy an accurate representation of how a photograph or video captured or recorded by the mobile computing device 304 may appear on the greeting card or may be presented with the augmented reality experience, according to some implementations. In some examples, one or more of the dimensions (e.g., height and width) of the cropped camera viewer 312 may be the same as one or more of the dimensions of a placeholder for a photograph on a greeting card or greeting card template, and in other examples one or more of the dimensions of the cropped camera viewer 312 may be different from the one or more of the dimensions of a placeholder for a photograph on a greeting card or greeting card template.

A family is shown in the cropped camera viewer 312, and in this example the family (a father, mother, and child) represents the subjects of the photograph and/or video. A shaded portion 314 (or greyed-out portion) of the display screen 303 shows, at a diminished display intensity as compared to a display intensity of the cropped camera viewer 312, the environment about the subjects, and in this example shows at the diminished or decreased display intensity the environment and portions of the subjects (e.g., areas below the waists of the adults and below the chest of the child) that are not included in the cropped camera viewer 312. In this example, the shaded portion 314 includes a shaded portion above the cropped camera viewer 312 and a shaded portion below the cropped camera viewer 312.

A camera control 316, which may be a user-interface feature, is presented, and may be selected by a user of the device. In this example, the camera control 316 is presented below the cropped camera viewer 312 and the shaded portion 314 of the display 303. In this example, the camera control 316 is presented in a control area 318 of the display, where additional controls or user interface features may be included in some examples. In some examples, the control area 318 may be blacked-out, and may be located at or near the bottom of the display 303.

The mobile computing device 304 may receive an input via the camera control 316, and may capture a high-resolution photograph in response to receiving the input. In some examples, a single high-resolution photograph can be captured in response to receipt of a camera control input. In some examples, multiple high-resolution photographs can be captured in response to receipt of a camera control input. In some examples, receipt of the camera control input causes a high-resolution photograph to be captured, and also causes a video to be recorded. Upon receipt of the camera control input, the mobile computing device may first capture a high-resolution photograph, and may then record a video after capturing the high-resolution photograph.

FIG. 5A depicts an example mobile computing device displaying a screen shot of an example user interface 330 through which a user may monitor capturing of a photograph for an augmented reality greeting card. The cropped camera viewer 312 provides a view of the subjects as the photograph is being captured, according to some examples. In some examples, the shaded portion 314 presents, at the diminished display intensity, the environment about the subjects, and in this example shows at the diminished or decreased display intensity the environment and portions of the subjects that are not included in the cropped camera viewer 312.

FIG. 5B depicts an example mobile computing device displaying a screen shot of an example user interface 340 through which a user may monitor recording of a video for an augmented reality greeting card. The cropped camera viewer 312 provides a view of the subjects as the video is being recorded, according to some examples. In some examples, the shaded portion 314 presents, at the diminished display intensity, the environment about the subjects, and in this example shows at the diminished or decreased display intensity the environment and portions of the subjects that are not included in the cropped camera viewer 312.

In some examples, a duration of the video can be limited to a predetermined duration. For example, a video may be restricted to a duration of four minutes or less, or other appropriate duration. A countdown timer 332 may be presented on the display 303, and may inform the user of a maximum time remaining for the video. A camera control feature 334 may be presented as a user interface feature, and may be selected by the user to end the recording of the video.

FIG. 6 depicts an example mobile computing device displaying a screen shot of an example user interface 350 through which a user may preview a recorded video for an augmented reality greeting card. As can be seen in FIG. 6, the area previously occupied by the lower shaded portion 314 (see FIGS. 4, 5A and 5B) has been replaced by a blacked-out portion 352 of the display. In some examples, the upper portion of the shaded portion may also be blacked out (depicted as shaded in FIG. 6), and a message (e.g., "Happy with the Result") may be displayed over the blacked out portion. A user of the mobile device computing 304 may preview the video by selecting a "play video" control 354, and in response the mobile computing device 304 may play the recorded video. If the user is satisfied with the video, the user may select a "Use This" control 356. If the user is not satisfied with the video, the user may select a "Retake" control 358 to record a new video. In some examples, the mobile computing device 304 may display a preview of the captured high-resolution photograph (not shown), and the user may be given the option of accepting the photograph. In examples where more than one high-resolution photograph is captured, the user may be allowed to preview the more than one high-resolution photographs and select one of the high-resolution photographs.

FIG. 7 depicts an example mobile computing device displaying a screen shot of an example user interface 370 through which a user may select to save the captured photograph and recorded video. In some examples, when the mobile computing device 304 receives an input via a "Save and Continue" control 372 user-interface feature, the mobile computing device 304 can associate the captured photograph with the recorded video. For example, the mobile computing device 304 can establish a link (e.g., an electronic link) between the captured photograph and the recorded video. In some examples, the recorded video may be uniquely associated with the captured photograph, for example as provided by the link between the captured photograph and the recorded video. In some examples, the link between the captured photograph and the recorded video can be later used to identify the recorded video (e.g., from a collection of several recorded videos) based on the captured photograph or on information associated with the captured photograph, for example. In some examples, the captured photograph and the recorded video can be included in a single file, while in other examples the captured photograph and the recorded video can be included in separate files.

The mobile computing device 304 may additionally provide the captured photograph and the recorded video to a computer system, such as the computer system 104 (see FIG. 1A), in response to the received input indicating that the user desires to save and continue. The mobile computing device 304 may transmit, for receipt by the computer system, the captured photograph and the recorded video. In some examples, in addition to providing the captured photograph and the recorded video, the mobile computing device 304 can provide additional information, such as information regarding the association of the captured photograph with the recorded video, or additional information regarding the captured photograph, the recorded video, the mobile computing device 304, or an account associated with the mobile computing device.

The computer system (e.g., computer system 104) may provide the mobile computing device 304 with information relating to greeting cards, and the mobile computing device 304 may receive the information. For example, the computer system may transmit card information that can include information regarding one or more greeting card themes, regarding one or more greeting card templates, or information relating to ordering greeting cards, delivery of greeting cards, or payments for greeting cards, according to some examples.

Figure 8:
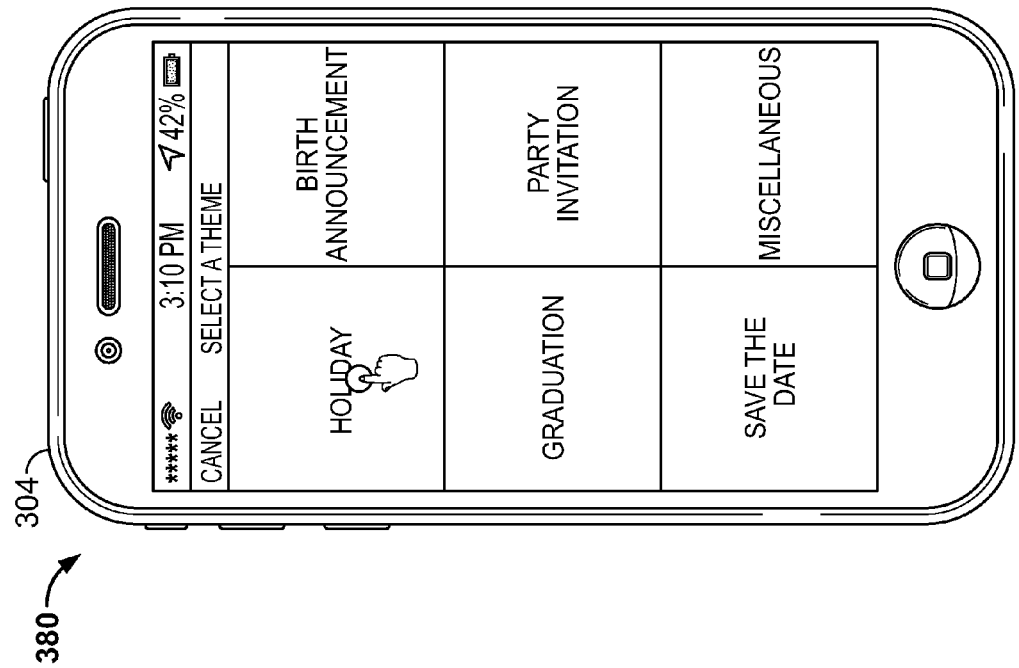
FIG. 8 depicts an example mobile computing device displaying a screen shot of an example user interface through which a user may select a greeting card theme.

FIG. 8 depicts an example mobile computing device displaying a screen shot of an example user interface 380 through which a user may select a greeting card theme. As can be seen in FIG. 8, mobile computing device 304 presents a selection of greeting card theme options, including "Holiday," "Birth Announcement," "Graduation," "Party Invitation," "Save The Date," and "Miscellaneous." In some examples, the theme options may be presented in a scrollable grid. In some examples, the theme options may be presented in a list format. A user may select a greeting card theme of interest; the mobile computing device 304 may receive the input, and may present various greeting card templates based on the selected theme. In this example, the user selects the "Holiday" theme.

Figure 9:
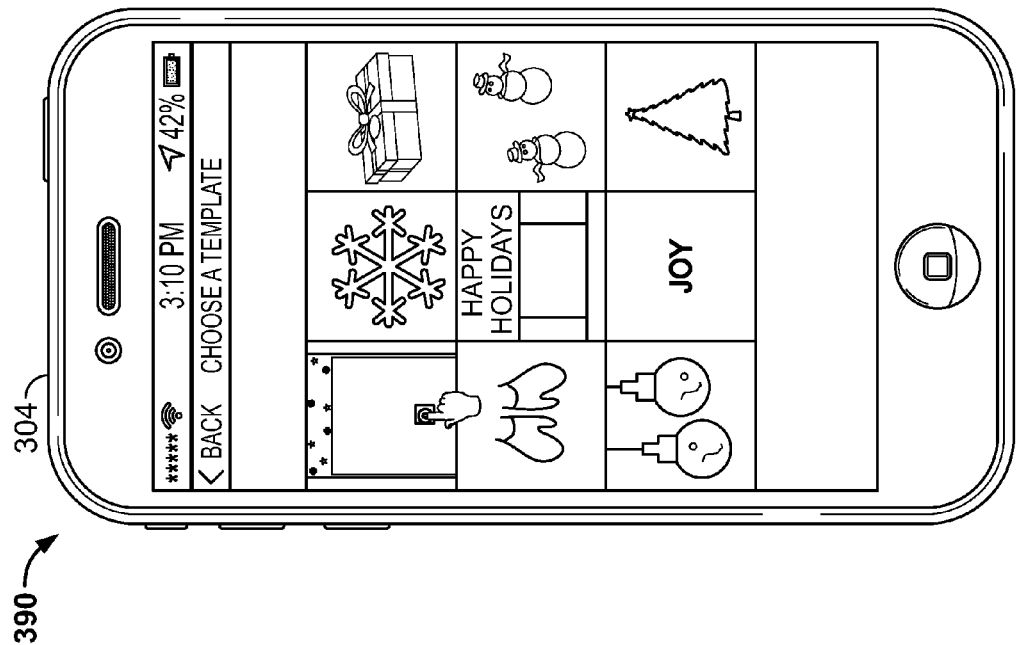
FIG. 9 depicts an example mobile computing device displaying a screen shot of an example user interface through which a user may select a greeting card template.

FIG. 9 depicts an example mobile computing device displaying a screen shot of an example user interface 390 through which a user may select a greeting card template. As can be seen in FIG. 9, mobile computing device 304 presents a selection of greeting card templates, and some examples can include a preview of the various greeting card templates. In some examples, the greeting card template options may be presented in a scrollable grid. Because the "Holiday" theme was selected in the example of FIG. 8, the greeting card templates presented in user interface 390 relate to holidays. A user may select a greeting card template of interest; the mobile computing device 304 may receive the input, and may present the greeting card template with the captured photograph.

Figure 10:
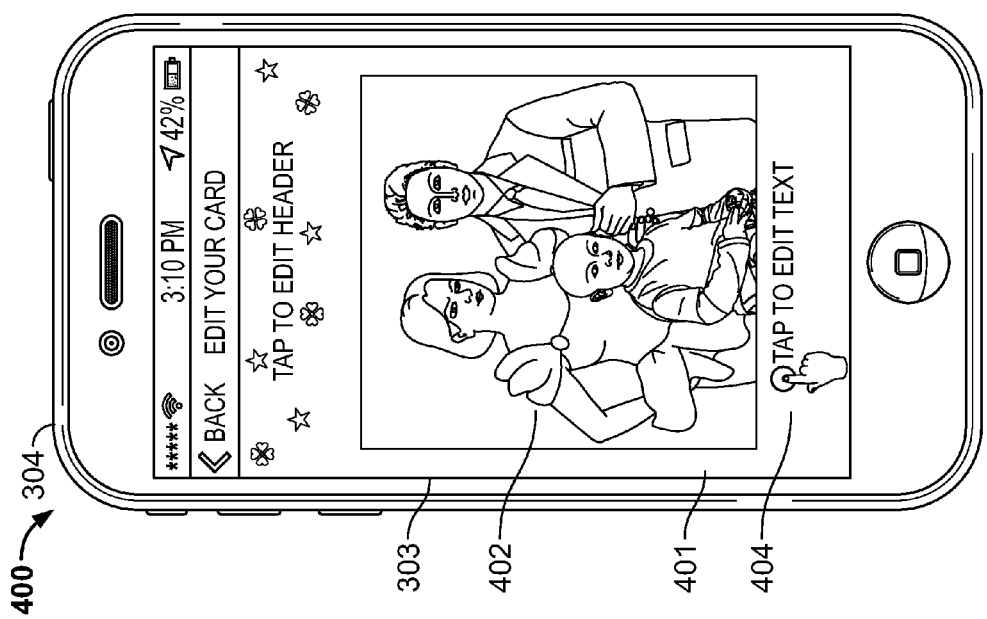
FIG. 10 depicts an example mobile computing device displaying a screen shot of an example user interface through which a user may view and edit a greeting card that includes a photograph.
Figure 15:
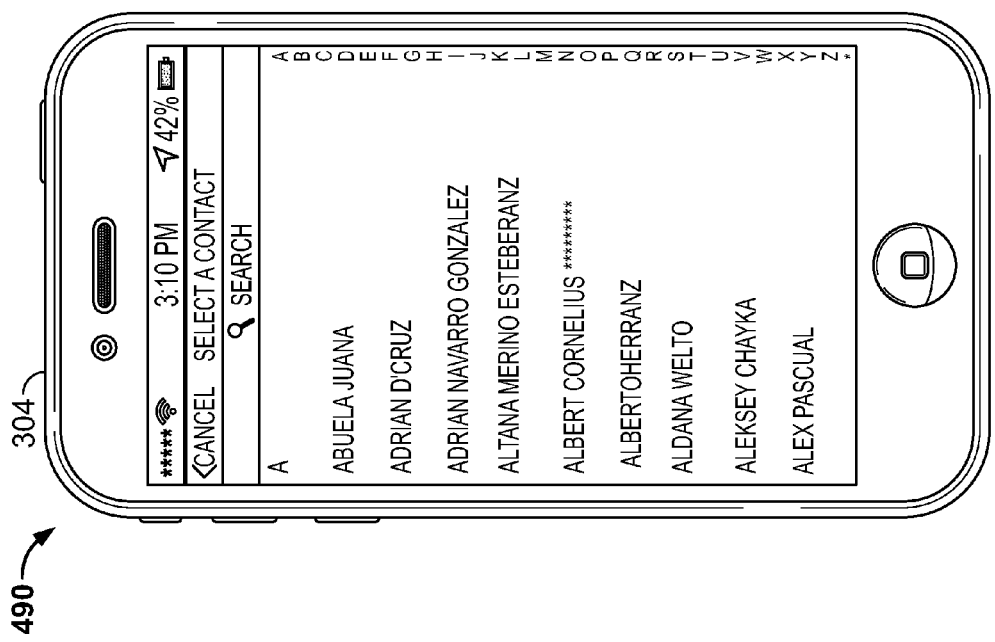
Figure 14:
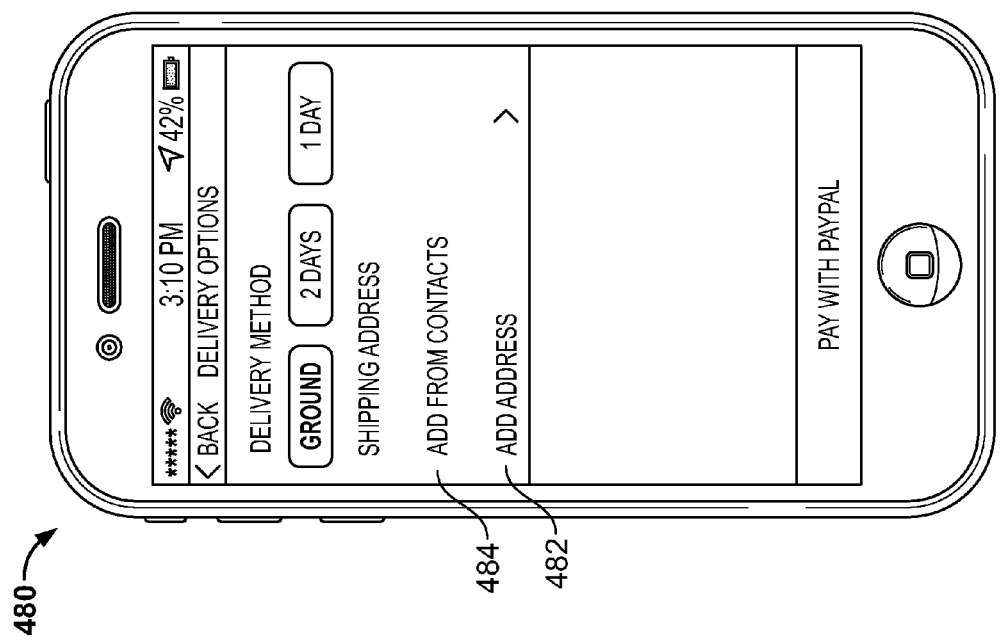
Figure 16:
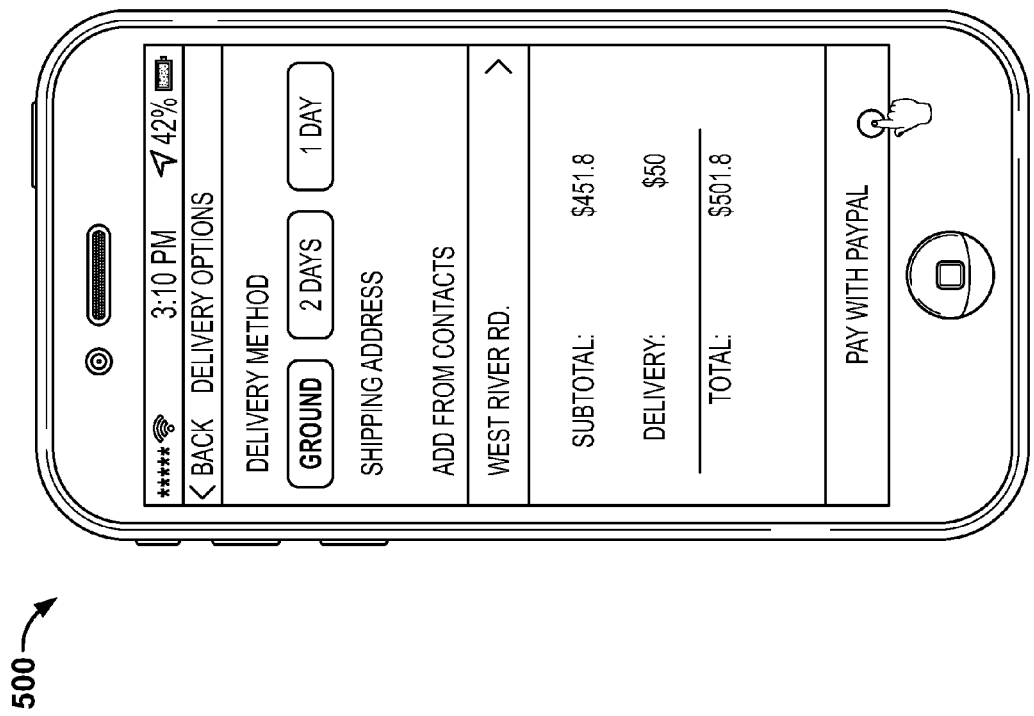

FIG. 10 depicts an example mobile computing device displaying a screen shot of an example user interface 400 through which a user may view and edit a greeting card 401 that includes a photograph 402. The greeting card 401 may correspond to the selected greeting card template, and the photograph 402 may correspond to the pre-cropped, high-resolution photograph that was captured prior to recording the video, described above with reference to FIG. 4. The pre-cropped, high-resolution photograph 402 has been included at the location of the photograph placeholder of the greeting card template.

The representation of the pre-cropped, high-resolution photograph 402 may meet the expectations of the user, for example because the photograph 402 includes an aspect ratio that matches the aspect ratio of the cropped camera viewer 312 (see FIG. 4) that the user viewed while the photograph was being captured. As such, the photograph 402 presented with the greeting card 401 in FIG. 10 may include as aspect of familiarity, which may provide confidence to the user that the photograph 402 has not been distorted or altered in an unexpected manner (e.g., by changing an aspect ratio) versus what the user viewed on the device while the photograph was being captured. In this example, the aspect ratio of the photograph 402 and of the cropped camera viewer 312 (see FIG. 4) is about 1:1. In other examples, the aspect ratios of the cropped camera viewer 312 and of the photograph 402 may be about 1.1:1, 1.2:1, 1.3:1, 1.4:1, or 1.5:1, or other appropriate aspect ratio.

In the depicted example, a size of the photograph 402 is somewhat smaller than a size of the cropped camera viewer 312 (see FIG. 4). In other examples, the size of the photograph 402 may be substantially similar to the size of the cropped camera viewer 312. In still other examples, the size of the photograph 402 may be larger than the size of the cropped camera viewer 312.

In some examples, a user may select one or more areas of the greeting card 401 to make changes or edits to the greeting card. For example, a user may select an area 404 to add text to the greeting card, such as to provide a more personalized greeting or message with the greeting card 401.

Figure 11:
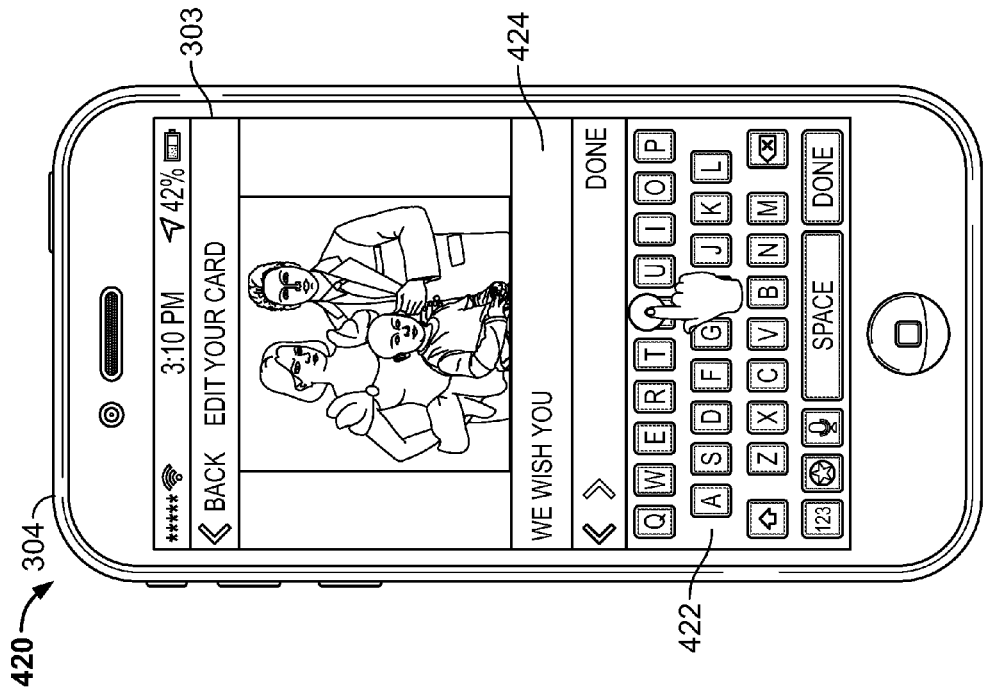
FIG. 11 depicts an example mobile computing device displaying a screen shot of an example user interface through which a user may make a change to a greeting card.

FIG. 11 depicts an example mobile computing device displaying a screen shot of an example user interface 420 through which a user may make a change to a greeting card. The user has selected to add text to the greeting card, such as "We wish you all the best for 2015," and a keyboard 422 through which the user may enter the text may be provided on the screen 303 of the device 304. The entered text may be presented in a text entry area 424, for example. In some examples, the user may be able to alter an arrangement of the greeting card. For example, the user may be able to reposition the photograph 402 to an alternative location on the card, or reposition or change text or graphics on the card.

FIG. 12 depicts an example mobile computing device displaying a screen shot of an example user interface 440 through which a user may select to order a greeting card. The greeting card 401 is presented with the pre-cropped, high-resolution photograph 402 and the received edits, and the user may select a user interface feature 444 (labeled "Order this card") to indicate satisfaction with the greeting card and that they wish to proceed with the order.

FIGS. 13-16 depict an example mobile computing device displaying screen shots of example user interfaces 460, 480, 490, 500 through which a user may provide order details. For example, user interface 460 (see FIG. 13) includes a text box 462 where a user may enter a desired quantity of greeting cards to be ordered. In various implementations, the user may type a number into the text box 462 (e.g., using a keyboard similar to the keyboard 422 of FIG. 11) or may use increment/decrement stepper user interface features 464 to specify a quantity. In some examples, a reduced-size preview 466 of the greeting card 401 is displayed. The price per greeting card ($0.20 in this example) may be displayed, and a sub-total for the selected quantity of cards may be displayed ($400, based on 2000 cards at $0.20 per card). In some examples, the user may select from one or more upgrade options 468, such as a folded greeting card or a digital copy of the greeting card. In some examples, the user may select to enter a promotional code or coupon 470, which may reduce the cost of the order.

A user can select a delivery method for the greeting cards via user interface 480 (see FIG. 14), such as standard or ground delivery, two-day delivery, or next-day delivery. The user can also provide shipping address information via user interface 480. The user can select an "Add Address" user interface feature 482, and can be presented with a keyboard and address entry fields (not shown) to provide a shipping address. In some examples, the user can select an "Add from contacts" user interface feature 484, and can be presented with a list of contacts, for example as depicted in user interface 490 of FIG. 15, from a contacts database of the mobile computing device 304, from which the user may select a contact to have the contact's address included in the order information. User interface 500 of FIG. 16 may be used to select a payment method, for example. In various implementations, a user may elect to pay with a credit card, via a debit card, via a digital wallet provider or payment processor (e.g., PayPal), via a bank account or other financial account, or via other appropriate payment methods.

Figure 17:
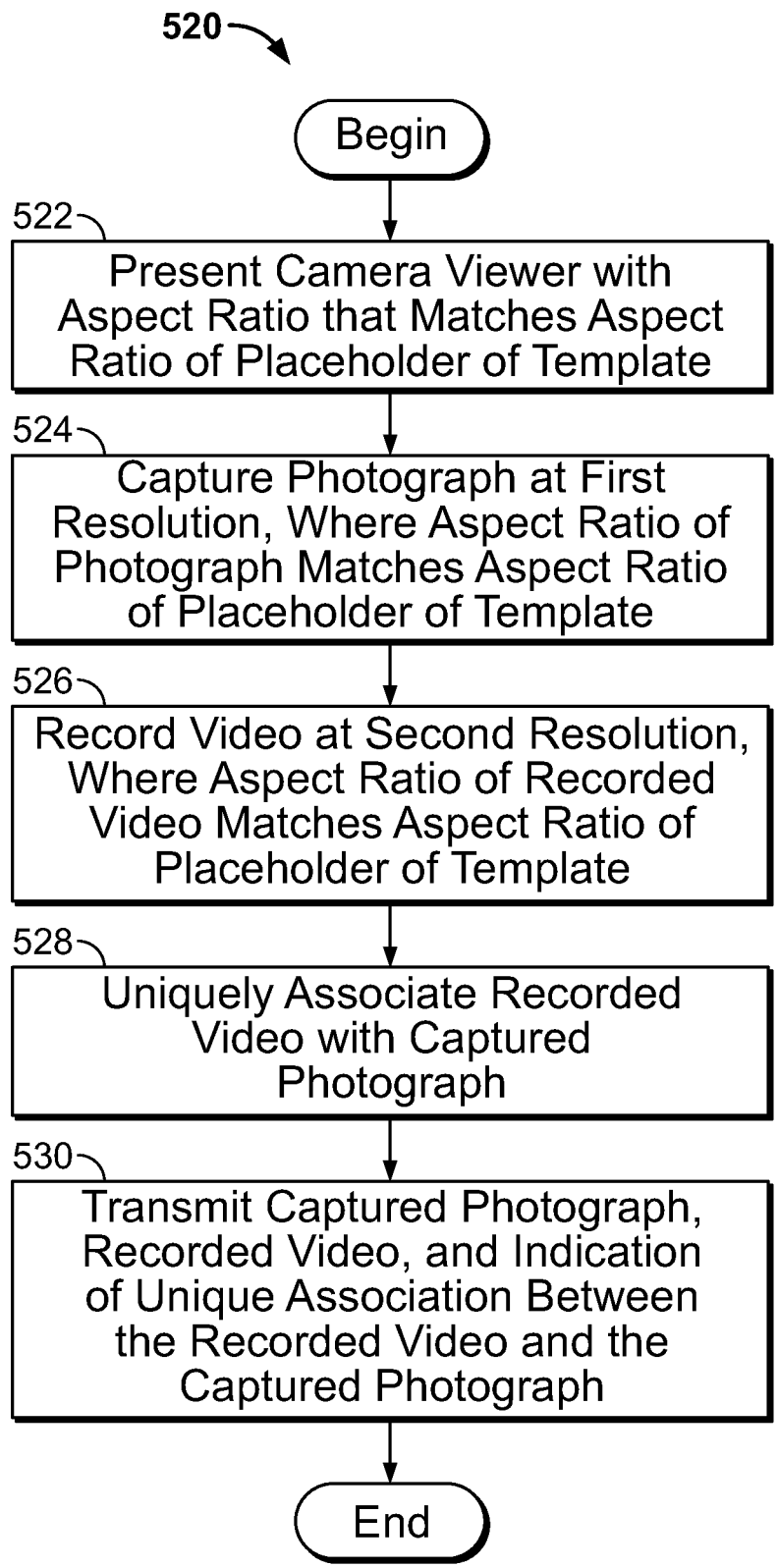
FIG. 17 is a flowchart of an example technique for acquiring electronic content for an augmented reality greeting card.

FIG. 17 is a flowchart of an example technique 520 for acquiring electronic content for an augmented reality greeting card. The example technique 520 can be performed by a mobile computing device that includes a camera. Examples of mobile computing devices that may perform the technique include a smartphone, a tablet-computing device, or any of the various mobile computing devices discussed herein.

At a first step 522, a mobile computing device presents, on a display screen of the mobile computing device, a camera viewer, where an aspect ratio of the camera viewer matches an aspect ratio of a placeholder of a predefined greeting card template. In some examples, the camera viewer presents a view based on light collected by a lens of the camera. In some examples, the aspect ratio is about 1:1 for each of the camera viewer the placeholder of the predefined greeting card template. In other examples, the matching aspect ratios may be about 1.1:1, 1.2:1, 1.3:1, 1.4:1, or 1.5:1. In some examples, the display screen of the mobile device has an aspect ratio of about 16:9 and the camera viewer has an aspect ratio of about 1:1 (or about 1.1:1, 1.2:1, 1.3:1, 1.4:1, or 1.5:1).

In some examples, the mobile computing device presents, on the display screen of the mobile computing device, a shaded view at a display intensity that is less than a display intensity of the camera viewer. In some examples, the shaded view surrounds the camera viewer, and in some examples that shaded view includes a portion above the camera viewer and a portion below the camera viewer. In some examples, the camera viewer occupies an area of the display screen that is less than an entire area of the display screen. In some examples, the camera viewer occupies an area of the display screen that is less than half of the entire area of the display screen. In some examples, the placeholder of the greeting card template is a placeholder for a photograph.

At a second step 524, the mobile computing device captures, using the camera of the mobile computing device, a photograph at a first resolution, where an aspect ratio of the captured photograph matches the aspect ratio of the placeholder of the greeting card template, and the aspect ratio of the camera viewer. In some examples, the first resolution corresponds to a maximum resolution of the camera. In some examples, the aspect ratio of the captured photograph is about 1:1 (or about 1.1:1, 1.2:1, 1.3:1, 1.4:1, or 1.5:1).

At a third step 526, the mobile computing device records, using the camera of the mobile computing device, a video at a second resolution that is lower than the first resolution, where an aspect ratio of the recorded video matches the aspect ratio of the placeholder of the greeting card template, and the aspect ratio of the camera viewer, and the aspect ratio of the captured photograph. In some examples, the photograph is captured before the video is recorded. In some examples, the recorded video comprises a plurality of individual frames of the video, and the captured photograph is different from each frame of the plurality of individual frames of the video. In some examples, the aspect ratio of the recorded video is about 1:1 (or about 1.1:1, 1.2:1, 1.3:1, 1.4:1, or 1.5:1).

At a fourth step 528, the mobile computing device uniquely associates the recorded video with the captured photograph. In some examples, the mobile computing device presents a preview of the captured photograph on the display screen of the mobile computing device, or presents on the display screen a preview of a greeting card based on the greeting card template, where the greeting card includes the captured photograph.

At a fifth step 530, the mobile computing device transmits, for receipt by a remote computer system, the captured photograph at the first resolution, the recorded video at the second resolution, and an indication of the unique association between the recorded video and the captured photograph.

Referring again to FIG. 3, a user may select a second area 305 of the user interface 300 (labeled "Scan a Card"), and the mobile computing device may receive the selection as a scan card input. In some implementations, receipt of a scan card input may indicate that the user desires to scan an augmented reality greeting card in anticipation of being presented an augmented reality experience. In response to receiving the scan card input, the mobile computing device 304 may scan a greeting card, or a portion of a greeting card.

FIG. 18 depicts an example mobile computing device displaying a screen shot of an example user interface 600, through which a user may initiate scanning of a greeting card 602 or a portion (e.g., a photograph 604) of the greeting card 602. For example, a user may use the mobile computing device 304 to scan a physical greeting card or a photograph on a physical greeting card. A scan window 606 may be presented on the display screen 303 of the mobile computing device 304. The scan window 606 may be a camera viewer, according to some implementations. In the depicted example, the greeting card 602 includes a photograph 604, and is shown in the scan window 606. For example, a lens of the camera of the device may be pointed towards the physical greeting card, and the device may present the view of the greeting card 602 (or a portion of the greeting card 602) in the scan window 606.

In some examples, greeting card 602 may be an augmented reality greeting card created using the devices, systems, and techniques discussed herein. For example, greeting card 602 may be a physical greeting card that includes a photograph 604 that is associated with augmented reality content, such as a video, and where the augmented reality content associated with the photograph may be presented on the mobile computing device 304 such that the augmented reality content "pops" from the photograph 604. The photograph 604 may be captured by a mobile computing device, and the associated augmented reality content (e.g., video) may be recorded by the mobile computing device, for example as described above with reference to steps B-D (124, 134, 136) of FIG. 1A. The photograph and the augmented reality content may be associated with one another, for example as described above with reference to step E (138) of FIG. 1A, and the greeting card 602 may be created, for example as described above with reference to step M (154) of FIG. 1A.

In some examples, the scan window 606 is a cropped camera viewer and includes a generally rectangular shape. In some examples, including the example depicted in FIG. 18, the scan window 606 occupies an area that is less than the area of the entire display screen 303. In some examples, the scan window 606 occupies substantially the entire display screen 303. A shaded portion 608 (or greyed-out portion) of the display screen 303 shows, at a diminished display intensity as compared to a display intensity of the scan window 606, an environment about the greeting card, and in this example shows at the diminished or decreased display intensity the environment and portions of the greeting card that are not included in the scan window 606. In this example, the shaded portion 608 includes a left portion and a right portion. In some examples, the shaded portion can surround the scan window 606 (not shown in FIG. 18).

In some examples, a user may tap the image of the greeting card displayed in the scan window 606 to provide a begin scan input for initiating a scan, and the mobile computing device 304 may receive the begin scan input. The mobile computing device 304 may then scan the greeting card 602. In some examples, the mobile computing device 304 scans the photograph 604 of the greeting card 602. There are many options for scanning the greeting card 602 or the photograph 604 of the greeting card 602. In some examples, the mobile computing device 304 captures an image of the greeting card 602 or of the photograph 604 of the greeting card 602. In some examples, the mobile computing device 304 is configured to process and scan the captured image.

In some examples, the mobile computing device 304 provides information from the scan of the greeting card or the photograph of the greeting card to a computer system (e.g., computer system 104, see FIG. 1A), such as a computer system located remotely from the mobile computing device 304. The computer system may receive the information and use the information to identify a photograph previously received from a mobile computing device. The identified photograph may be associated with augmented reality content (e.g., via a link), and the computer system may identify the augmented reality content (e.g., a video) based on the association between the photograph and the augmented reality content. The computer system may provide the augmented reality content to the mobile computing device 304, according to some implementations. In some examples, the computer system may also provide information regarding presentation of the augmented reality content, such as information pertaining to how to present the augmented reality content with respect to the photograph 604 on the greeting card 602.

FIG. 19 depicts an example mobile computing device displaying a screen shot of an example user interface 620 that can be used to present an augmented reality experience. In various implementations, the mobile computing device 304 may receive augmented reality content that is associated with the greeting card 602 (e.g., associated with a photograph of the greeting card), as described above herein. In some examples, upon receipt of the augmented reality content (e.g., a video), the mobile computing device 304 may present the augmented reality content on the display screen 303 of the mobile computing device 304. The mobile computing device may present the augmented reality content in a manner such that it appears to "pop" or spring from the photograph on the greeting card. For example, a video may be presented such that the subjects of the video initially align with the subjects of the photograph of the greeting card. When the video begins to play, it may appear that the subjects of the photograph "come to life" and begin interacting with the user, for example. In some examples, the mobile computing device 304 may present the augmented reality content after receipt of a user input, such as a user selection of a user interface feature.

Computing devices and computer systems described in this document that may be used to implement the systems, techniques, machines, and/or apparatuses can operate as clients and/or servers, and can include one or more of a variety of appropriate computing devices, such as laptops, desktops, workstations, servers, blade servers, mainframes, mobile computing devices (e.g., PDAs, cellular telephones, smartphones, and/or other similar computing devices), computer storage devices (e.g., Universal Serial Bus (USB) flash drives, RFID storage devices, solid state hard drives, hard-disc storage devices), and/or other similar computing devices. For example, USB flash drives may store operating systems and other applications, and can include input/output components, such as wireless transmitters and/or USB connector that may be inserted into a USB port of another computing device.

Such computing devices may include one or more of the following components: processors, memory (e.g., random access memory (RAM) and/or other forms of volatile memory), storage devices (e.g., solid-state hard drive, hard disc drive, and/or other forms of non-volatile memory), high-speed interfaces connecting various components to each other (e.g., connecting one or more processors to memory and/or to high-speed expansion ports), and/or low speed interfaces connecting various components to each other (e.g., connecting one or more processors to a low speed bus and/or storage devices). Such components can be interconnected using various busses, and may be mounted across one or more motherboards that are communicatively connected to each other, or in other appropriate manners. In some implementations, computing devices can include pluralities of the components listed above, including a plurality of processors, a plurality of memories, a plurality of types of memories, a plurality of storage devices, and/or a plurality of buses. A plurality of computing devices can be connected to each other and can coordinate at least a portion of their computing resources to perform one or more operations, such as providing a multi-processor computer system, a computer server system, and/or a cloud-based computer system.

Processors can process instructions for execution within computing devices, including instructions stored in memory and/or on storage devices. Such processing of instructions can cause various operations to be performed, including causing visual, audible, and/or haptic information to be output by one or more input/output devices, such as a display that is configured to output graphical information, such as a graphical user interface (GUI). Processors can be implemented as a chipset of chips that include separate and/or multiple analog and digital processors. Processors may be implemented using any of a number of architectures, such as a CISC (Complex Instruction Set Computers) processor architecture, a RISC (Reduced Instruction Set Computer) processor architecture, and/or a MISC (Minimal Instruction Set Computer) processor architecture. Processors may provide, for example, coordination of other components computing devices, such as control of user interfaces, applications that are run by the devices, and wireless communication by the devices.

Memory can store information within computing devices, including instructions to be executed by one or more processors. Memory can include a volatile memory unit or units, such as synchronous RAM (e.g., double data rate synchronous dynamic random access memory (DDR SDRAM), DDR2 SDRAM, DDR3 SDRAM, DDR4 SDRAM), asynchronous RAM (e.g., fast page mode dynamic RAM (FPM DRAM), extended data out DRAM (EDO DRAM)), graphics RAM (e.g., graphics DDR4 (GDDR4), GDDR5). In some implementations, memory can include a non-volatile memory unit or units (e.g., flash memory). Memory can also be another form of computer-readable medium, such as magnetic and/or optical disks.

Storage devices can be capable of providing mass storage for computing devices and can include a computer-readable medium, such as a floppy disk device, a hard disk device, an optical disk device, a Microdrive, or a tape device, a flash memory or other similar solid state memory device, or an array of devices, including devices in a storage area network or other configurations. Computer program products can be tangibly embodied in an information carrier, such as memory, storage devices, cache memory within a processor, and/or other appropriate computer-readable medium. Computer program products may also contain instructions that, when executed by one or more computing devices, perform one or more methods or techniques, such as those described above.

High speed controllers can manage bandwidth-intensive operations for computing devices, while the low speed controllers can manage lower bandwidth-intensive operations. Such allocation of functions is exemplary only. In some implementations, a high-speed controller is coupled to memory, display 616 (e.g., through a graphics processor or accelerator), and to high-speed expansion ports, which may accept various expansion cards; and a low-speed controller is coupled to one or more storage devices and low-speed expansion ports, which may include various communication ports (e.g., USB, Bluetooth, Ethernet, wireless Ethernet) that may be coupled to one or more input/output devices, such as keyboards, pointing devices (e.g., mouse, touchpad, track ball), printers, scanners, copiers, digital cameras, microphones, displays, haptic devices, and/or networking devices such as switches and/or routers (e.g., through a network adapter).

Displays may include any of a variety of appropriate display devices, such as TFT (Thin-Film-Transistor Liquid Crystal Display) displays, OLED (Organic Light Emitting Diode) displays, touchscreen devices, presence sensing display devices, and/or other appropriate display technology. Displays can be coupled to appropriate circuitry for driving the displays to output graphical and other information to a user.

Expansion memory may also be provided and connected to computing devices through one or more expansion interfaces, which may include, for example, a SIMM (Single In Line Memory Module) card interfaces. Such expansion memory may provide extra storage space for computing devices and/or may store applications or other information that is accessible by computing devices. For example, expansion memory may include instructions to carry out and/or supplement the techniques described above, and/or may include secure information (e.g., expansion memory may include a security module and may be programmed with instructions that permit secure use on a computing device).

Computing devices may communicate wirelessly through one or more communication interfaces, which may include digital signal processing circuitry when appropriate. Communication interfaces may provide for communications under various modes or protocols, such as GSM voice calls, messaging protocols (e.g., SMS, EMS, or MMS messaging), CDMA, TDMA, PDC, WCDMA, CDMA2000, GPRS, 4G protocols (e.g., 4G LTE), and/or other appropriate protocols. Such communication may occur, for example, through one or more radio-frequency transceivers. In addition, short-range communication may occur, such as using a Bluetooth, Wi-Fi, or other such transceivers. In addition, a GPS (Global Positioning System) receiver module may provide additional navigation- and location-related wireless data to computing devices, which may be used as appropriate by applications running on computing devices.

Computing devices may also communicate audibly using one or more audio codecs, which may receive spoken information from a user and convert it to usable digital information. Such audio codecs may additionally generate audible sound for a user, such as through one or more speakers that are part of or connected to a computing device. Such sound may include sound from voice telephone calls, may include recorded sound (e.g., voice messages, music files, etc.), and may also include sound generated by applications operating on computing devices.

Computing devices can also include one or more sensors through which various states of and around the computing devices can be detected. For example, computing devices can include one or more accelerometers that can be used to detect motion of the computing devices and details regarding the detected motion (e.g., speed, direction, rotation); one or more gyroscopes that can be used to detect orientation of the computing devices in 3D space; light sensors that can be used to detect levels of ambient light at or around the computing devices; touch and presence sensors that can be used to detect contact and/or near-contact with one or more portions of the computing devices; environmental sensors (e.g., barometers, photometers, thermometers) that can detect information about the surrounding environment (e.g., ambient air temperature, air pressure, humidity); other motion sensors that can be used to measure acceleration and rotational forces (e.g., gravity sensors, rotational vector sensors); position sensors that can be used to detect the physical position of the computing devices (e.g., orientation sensors, magnetometers), and/or other appropriate sensors.

Various implementations of the systems, devices, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., LCD display screen, LED display screen) for displaying information to users, a keyboard, and a pointing device (e.g., a mouse, a trackball, touchscreen) by which the user can provide input to the computer. Other kinds of devices can be used to provide for interaction with a user as well; for example, feedback provided to the user can be any form of sensory feedback (e.g., visual feedback, auditory feedback, and/or tactile feedback); and input from the user can be received in any form, including acoustic, speech, and/or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Additionally, the steps and techniques described above as being performed by some computing devices and/or systems may alternatively, or additionally, be performed by other computing devices and/or systems that are described above or other computing devices and/or systems that are not explicitly described. Similarly, the systems, devices, and apparatuses may include one or more additional features, may exclude one or more of the identified features, and/or include the identified features combined in a different way than presented above. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, and/or the positioning of features relative to each other are possible.

What is claimed is:

1. A method of acquiring electronic content for an augmented reality greeting card, the method comprising:
   presenting, on a display screen of a mobile computing device that includes a camera, a camera viewer, wherein an aspect ratio of the camera viewer matches an aspect ratio of a placeholder of a predefined greeting card template;
   capturing, via the camera of the mobile computing device, a photograph at a first resolution, wherein an aspect ratio of the captured photograph matches the aspect ratio of the placeholder of the greeting card template;
   recording, via the camera of the mobile computing device, a video at a second resolution that is lower than the first resolution, wherein an aspect ratio of the recorded video matches the aspect ratio of the placeholder of the greeting card template;
   uniquely associating the recorded video with the captured photograph; and
   transmitting, for receipt by a remote computer system, the captured photograph at the first resolution, the recorded video at the second resolution, and an indication of the unique association between the recorded video and the captured photograph, via a transmitter of the mobile computing device.

2. The method of claim 1, further comprising presenting a preview of the captured photograph on the display screen of the mobile computing device.

3. The method of claim 1, further comprising presenting a preview of a greeting card on the display screen of the mobile computing device, wherein the greeting card is based on the greeting card template, and wherein the preview of the greeting card includes the captured photograph.

4. The method of claim 1, wherein the video comprises a plurality of individual frames of the video, and wherein the captured photograph is different from each frame of the plurality of individual frames of the video.

5. The method of claim 1, wherein the photograph is captured before the video is recorded.

6. The method of claim 1, wherein the recorded video is uniquely associated with the captured photograph based on a naming convention.

7. The method of claim 1, wherein the aspect ratio of the camera viewer is in a range of about 1:1 to about 1.3:1.

8. The method of claim 1, wherein the placeholder of the greeting card template is a placeholder for a photograph.

9. The method of claim 1, further comprising presenting, on the display screen of the mobile computing device, a shaded view at a display intensity that is less than a display intensity of the camera viewer.

10. The method of claim 1, wherein the camera viewer occupies an area of the display screen that is less than an entire area of the display screen.

11. The method of claim 1, wherein the display screen has an aspect ratio of about 16:9 and the camera viewer has an aspect ratio in a range of about 1:1 to about 1.3:1.

12. The method of claim 1, further comprising presenting, on the display screen of the mobile computing device, (i) a view of a greeting card that includes the captured photograph, and (ii) the recorded video.

13. A method of acquiring electronic content for an augmented reality greeting card, the method comprising:
    presenting, on a display screen of a mobile computing device that includes a camera, a camera viewer, wherein an aspect ratio of the camera viewer matches an aspect ratio of a placeholder of a predefined greeting card template;
    capturing, via the camera of the mobile computing device, a photograph at a first resolution, wherein an aspect ratio of the captured photograph matches the aspect ratio of the placeholder of the greeting card template;
    recording, via the camera of the mobile computing device, a video at a second resolution that is lower than the first resolution, wherein an aspect ratio of the recorded video matches the aspect ratio of the placeholder of the greeting card template;
    uniquely associating the recorded video with the captured photograph;
  presenting a preview of the captured photograph on the display screen of the mobile computing device; and
    transmitting, for receipt by a remote computer system, the captured photograph at the first resolution, the recorded video at the second resolution, and an indication of the unique association between the captured photograph and the recorded video, via a transmitter of the mobile computing device.

14. The method of claim 13, wherein the presenting the preview of the captured photograph comprises presenting a preview of a greeting card that includes the captured photograph, wherein the greeting card is based on the greeting card template.

15. The method of claim 13, wherein the video comprises a plurality of individual frames of the video, and wherein the captured photograph is different from each frame of the plurality of individual frames of the video.

16. The method of claim 13, wherein the photograph is captured before the video is recorded.

17. The method of claim 13, wherein the display screen has an aspect ratio of about 16:9 and the camera viewer has an aspect ratio in a range of about 1:1 to about 1.3:1.

18. A method of acquiring electronic content for an augmented reality greeting card, the method comprising:
    presenting, on a display screen of a mobile computing device that includes a camera, a camera viewer, wherein an aspect ratio of the camera viewer matches an aspect ratio of a placeholder of a predefined greeting card template;
    capturing, via the camera of the mobile computing device, a photograph at a first resolution, wherein an aspect ratio of the captured photograph matches the aspect ratio of the placeholder of the greeting card template;
    recording, via the camera of the mobile computing device, a video at a second resolution that is lower than the first resolution, wherein an aspect ratio of the recorded video matches the aspect ratio of the placeholder of the greeting card template, wherein the video comprises a plurality of individual frames of the video, and wherein the captured photograph is different from each frame of the plurality of individual frames of the video, and wherein the photograph is captured before the video is recorded;

uniquely associating the recorded video with the captured photograph;

presenting a preview of a greeting card on the display screen of the mobile computing device, wherein the greeting card is based on the greeting card template and includes the captured photograph; and transmitting, for receipt by a remote computer system, the captured photograph at the first resolution, the recorded video at the second resolution, and an indication of the unique association between the captured photograph and the recorded video, via a transmitter of the mobile computing device.

19. The method of claim 18, wherein the display screen has an aspect ratio of about 16:9 and the camera viewer has an aspect ratio in a range of about 1:1 to about 1.3:1.

20. The method of claim 18, wherein the camera viewer occupies an area of the display screen that is less than an entire area of the display screen.

* * * * *